(12) United States Patent
Burge

(10) Patent No.: US 10,197,080 B2
(45) Date of Patent: Feb. 5, 2019

(54) RAIL-TO-RAIL COUPLER FOR TOY GUNS AND CAMERA ACCESSORIES

(71) Applicant: Benjamin D Burge, Shaker Heights, OH (US)

(72) Inventor: Benjamin D Burge, Shaker Heights, OH (US)

(*) Notice: Subject to any disclaimer, the term of this patent is extended or adjusted under 35 U.S.C. 154(b) by 0 days.

(21) Appl. No.: 15/438,614

(22) Filed: Feb. 21, 2017

(65) Prior Publication Data

US 2017/0241735 A1 Aug. 24, 2017

Related U.S. Application Data

(60) Provisional application No. 62/389,188, filed on Feb. 19, 2016.

(51) Int. Cl.
| | |
|---|---|
| *F41B 7/08* | (2006.01) |
| *F16B 7/18* | (2006.01) |
| *G03B 17/56* | (2006.01) |
| *F41B 11/89* | (2013.01) |
| *F41B 7/00* | (2006.01) |
| *F41G 11/00* | (2006.01) |

(52) U.S. Cl.
CPC ............. *F16B 7/18* (2013.01); *F41B 7/003* (2013.01); *F41B 7/08* (2013.01); *F41B 11/89* (2013.01); *F41G 11/003* (2013.01); *G03B 17/561* (2013.01)

(58) Field of Classification Search
CPC .. F41B 5/12; F41B 5/126; F41B 7/003; F41B 7/08; F41B 11/89
See application file for complete search history.

(56) References Cited

U.S. PATENT DOCUMENTS

| | | | |
|---|---|---|---|
| 8,402,956 B2* | 3/2013 | Dakan | F41B 7/006 124/27 |
| 8,978,634 B2* | 3/2015 | Darlington | F41B 5/12 124/25 |
| 9,273,926 B2* | 3/2016 | Wood | F41G 11/003 |
| 9,291,421 B1* | 3/2016 | Kempf | F41B 5/12 |
| 9,599,426 B2* | 3/2017 | Darlington | F41B 5/12 |

* cited by examiner

*Primary Examiner* — John Ricci
(74) *Attorney, Agent, or Firm* — David A. Burge; Benjamin D. Burge

(57) ABSTRACT

An apparatus includes two halves of a rail-to-rail coupler, wherein each half carries at least one rail engagement formation comprising at least two teeth separated by at least one notch to enable engagement with a portion of a rail associated with a toy gun that incorporates at least one rail stop; and at least one passage is formed through each half that aligns with the at least one passage formed through the other of the two halves to provide a dart storage position into which a dart may be inserted when the two halves are assembled together to engage a rail associated with a toy gun.

2 Claims, 20 Drawing Sheets

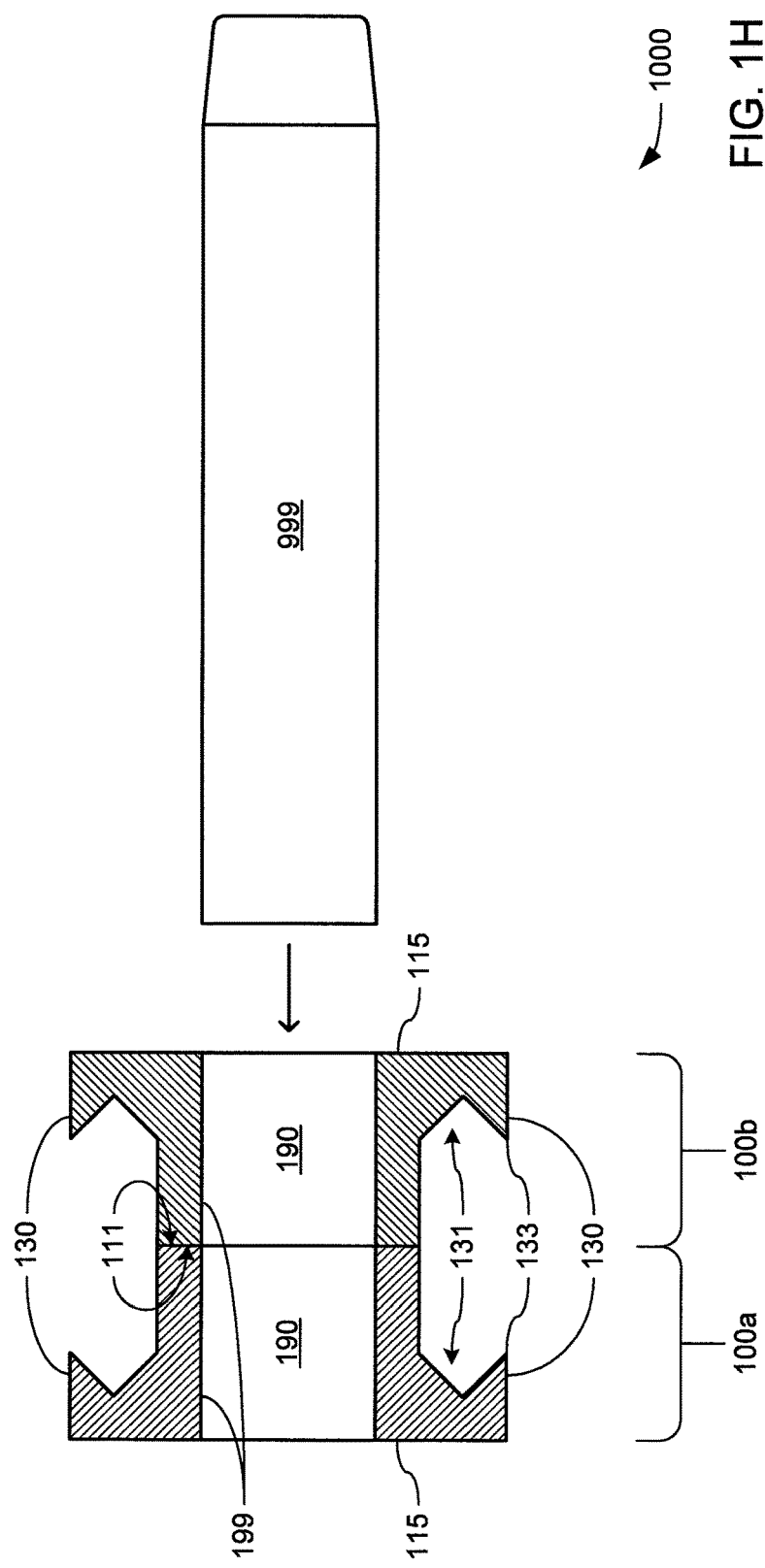

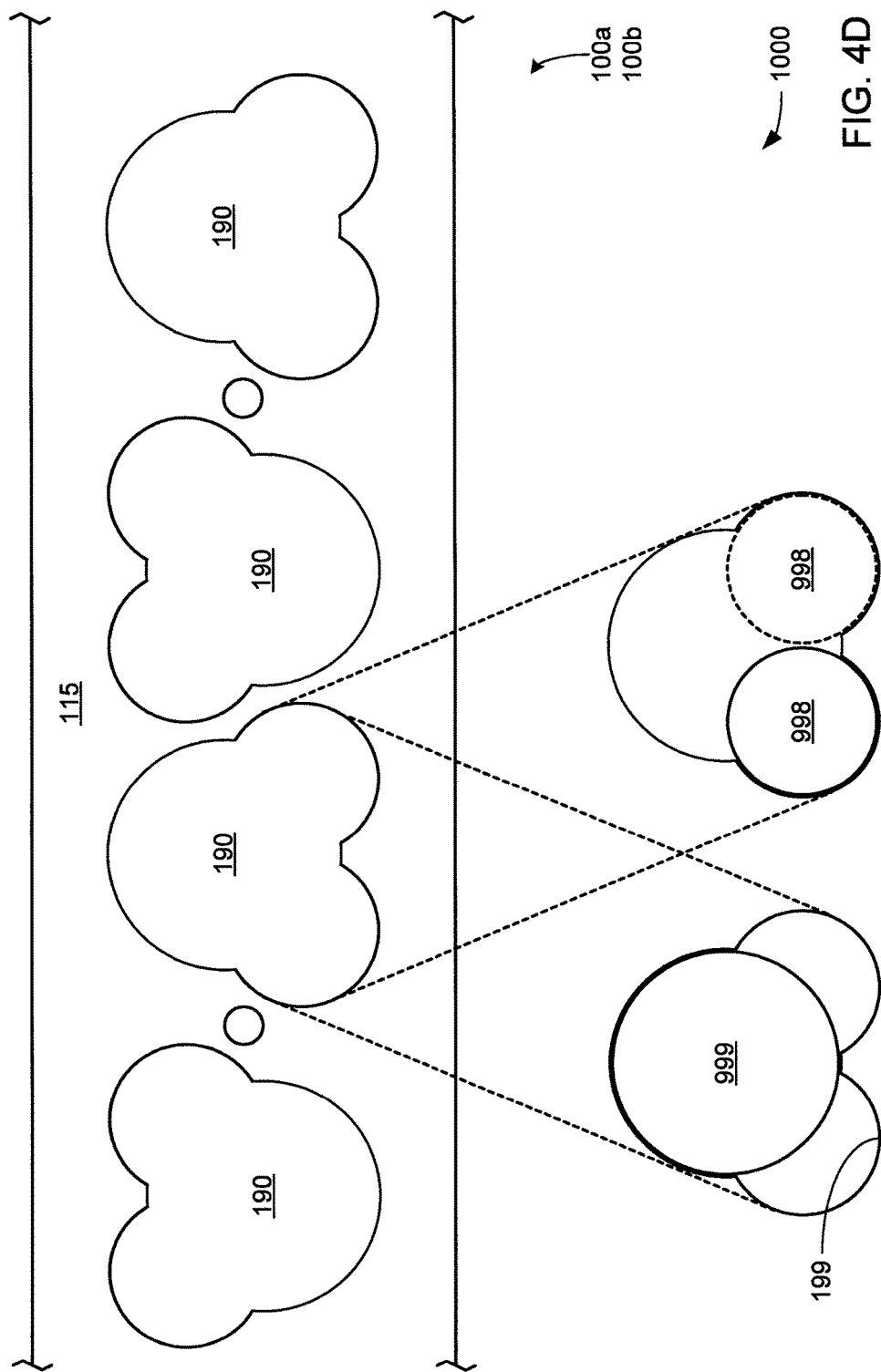

RAIL-TO-RAIL COUPLER FOR TOY GUNS AND CAMERA ACCESSORIES

REFERENCE TO PROVISIONAL APPLICATION

This Utility application claims the benefit of the filing date of Provisional Application Ser. No. 62/389,188 filed Feb. 19, 2016 by Benjamin D. Burge, the disclosure of which is incorporated herein by reference.

BACKGROUND

Various embodiments are directed to the field of rail-to-rail couplers to couple two or more devices to each other via elongate rails carried by each, and that may also retain related cylindrical articles inserted into apertures of the couplers. More specifically, embodiments are directed to rail-to-rail couplers to couple two or more toy guns (often referred to as "blasters" to distinguish them from real firearms), cameras and/or camera accessories by clamping onto elongate rails and/or mounting shoes having cross-sections similar to such rails.

Such rails are often carried by one or more external portions of typical "blasters" to enable the attachment of various accessories, including so-called "scopes" (often little more than a plastic tube that may or may not include clear sheets of plastic that take the place of real lenses), real scopes that provide some degree of viewing magnification and/or low-light viewing, ammunition holders (often small plastic parts that are able to hold one or more foam darts, plastic darts, rubberized plastic discs, foam balls, sponge-like balls, arrows with or without rubberized and/or foam tips, etc.), handles, lights, microphones, cameras, camera flashes, bipods, tripods and/or still other camera-related accessories.

Hasbro, Incorporated is the manufacturer of a very large line of these blasters under their Nerf trademark. Many of these are designed to fire a foam dart formed from ½" diameter hollow foam rods that usually have some form of rubberized and/or elastic foam tip glued or otherwise bonded onto one end. Others of such darts may have pieces of hook-and-loop type fastening material glued or bonded onto one end, possibly onto such a rubberized and/or elastic foam tip on that end. These foam darts (typically about 2 to 3 inches long). have become so very pervasive in the toy industry, that they have become something of a de facto standard that many competitors copy the design of when they offer competing blasters.

The Nerf blaster product line has been known to use other types of "ammunition" such as the recently introduced "Mega" darts that are of substantially the same structure, but larger in all dimensions—typically ¾" diameter hollow foam rods with a rubberized tip glued onto one end, and typically about 3 to 4 inches long. Various competing product lines to the Nerf blaster product line have also used other darts of similar configuration, but differing dimensions.

Mattel Corporation is the manufacturer of one competing line of blasters under their newly created BoomCo trademark. Many of these are designed to fire a plastic dart formed from ⅜" diameter hollow plastic tubing material that resembles the material from which drinking straws are often made. Like the Nerf foam darts, the BoomCo plastic darts usually have a rubberized tip glued (or otherwise connected to) one end of the main drinking-straw-like body.

Although Mattel has introduced their own competing type of "ammunition" as an alternative to the ½" diameter foam darts offered by Hasbro, Mattel has adopted a rail design for the attachment of accessories that is dimensionally very similar to the "tactical rails" offered by Hasbro. More specifically, both types of rail are generally connected by a ½" wide narrower portion to an external surface of a blaster, while the rails themselves are about ¾" wide.

Other manufacturers of blasters, and other toys of other varieties that fire paint balls, marker balls and even small arrows or bolts have adopted and use rails on their products that adhere to the shape, dimensions and other characteristics of either of both of the Picatinny Rail or the Weaver Rail. Picatinny Rail was adopted by the U.S. military as a standard (MIL-STD-1913), and became the basis of a newer standard adopted by the North Atlantic Treaty Organization (NATO) as the NATO Accessory Rail (NAR) or STANAG 4694. The specifications of MIL-STD-1913 and the derivative STANAG 4694 are each incorporated herein by reference in their entirety.

Both Hasbro (as Nerf) and Mattel (as BoomCo) offer various attachments that slide onto their respective rails from one of the ends of the rails, and are designed to engage a rail stop or other formation incorporated into (or otherwise connected to or associated with) the rails at a position where such slide-on accessories are then caused to stop moving therealong. Over time, various vendors (including those with 3D printers) have sought to create their own accessories designed for attachment to such blasters via such rails. Unfortunately, unlike what is typically encountered in the manufacturing of Picatinny rail and the various derivatives discussed above, the manufacturing tolerances employed by Hasbro and Mattel in their rails have been sufficiently "loose" as to frustrate efforts to develop such attachments. Hasbro and Mattel typically design their own slide-on accessories with rail engagement formations made of plastic that is sufficiently flexible as to accommodate such variances in rail dimensions. In contrast, the PLA and ABS plastics typically used in the making of plastic parts by 3D printers are usually too stiff.

As a result, some of such vendors have taken to designing their accessories to employ various clamping mechanisms, many employing screws or other such hardware, to impart a degree of adjustability in their designs to accommodate these variances in rail dimensions.

More recently, Hasbro, Incorporated has begun to offer video cameras that designed to be coupled to many of their blasters by gripping the rails thereof with a clamping mechanism. It should be noted that such video cameras, which can include relatively heavy battery power supplies, are among the heavier attachments offered by Hasbro, as well as other entities, for attachment to such rails. This use of a clamping mechanism by Hasbro for such cameras is believed to be the first instance of Hasbro employing a clamping mechanism with any accessory intended to be mounted to blasters by such rails.

Sharing similar dimensions and other physical attributes to the rails provided by such toy manufacturers as Hasbro and Mattel are the mounting shoes employed for decades by manufacturers of cameras and accessories for cameras. More specifically, many cameras for decades have offered a single "hot shoe" or "cold shoe" mounting point on the top surface thereof for the attachment of a flash. A hot shoe is distinguished from a cold shoe in that a hot shoe includes an electrical contact that enables a camera to trigger operation of the flash through the hot shoe, thereby obviating the need for an external cable between the camera and the flash. A cold shoe provides the physical mounting capability of a hot shoe, but not the electrical contact and corresponding ability to control operation of a flash.

Since the introduction of both varies of shoe mounting point, at least the cold shoe variety has gone on to be adopted by many camera manufacturers and manufacturers of accessories for cameras to either alternatively or additionally provide a mounting point for the mounting of an external microphone and/or external lights to cameras. Indeed, such extensive use has been made of the such mounting points that various mounting point expansion accessories have also been offered that mount to the single shoe mounting point often provided by a camera to then provide two or more shoe mounting points to enable the attachment of multiple other accessories, simultaneously.

It appears that, possibly by happenstance, the cross-section of such mounting shoes very closely resemble the cross-section of the rails provided on the casings of blasters offered by both Hasbro and Mattel. It has become increasingly commonplace for those who engage in the recreational activity of using such blasters in playtime "combat" (e.g., so-called "Nerf wars" or "Humans vs. Zombies" games) to mount video cameras to their blasters to generate "point-of-view" videos of their "combat" exploits from a perspective aligned with the barrels of their blasters. Many of the same vendors offering 3D printed attachments for use with such rails have sought to create various camera mount adapting attachments to enable the attachment, to such rails, of cameras that use the typical ¼" tripod screw mount or the hinged camera mount more recently introduced and popularized by GoPro, Incorporated.

SUMMARY

Embodiments of the rail-to-rail coupler described and depicted herein may include two largely identical halves that employ one or more screws and aligned screw apertures to enable the rail-to-rail coupler to be clamped onto such a rail carried by one or more blasters, and/or onto shoe mounts carried by one or more cameras and/or camera accessories, by tightening the two halves together. Also incorporated into embodiments of the rail-to-rail coupler described and depicted herein are other aligned passages of larger dimension than the screw apertures to provide one or more storage positions for one or more foam or plastic darts of the type used by such blasters, and/or to receive one or more threaded rods used to support other accessories for blasters and/or cameras.

Pairs of such aligned passages may take the form of passages with substantially round cross-sections that align between the two halves such that such pairs of aligned passages each hold a single dart of a particular diameter for which the pair of aligned passages was designed. Such round cross-sections may be defined by relatively smooth cylindrical surfaces and/or cylindrical surfaces that define female threads to engage the male threads of various cylindrical objects, such as threaded rods, shafts and/or bolts.

Alternatively or additionally each such a pair of aligned passages may have a more complex cross-sections that may resemble two intersecting round cross-section passages that each open up into the other such that their otherwise round cross-sections partially overlap. In essence, each of such passages is made up of two intersecting round portions that are each given a diameter intended to accommodate a dart and/or threaded rod of a different diameter from the other. The resulting cross-section defines a pair of inwardly extending intrusions that serve to partly surround a dart inserted into either of the two round portions, and that more specifically aid in holding a dart of the smaller of the two diameters within the one of the two round portions that is given the smaller diameter to match that smaller diameter dart—thereby preventing that smaller diameter dart from simply falling or otherwise migrating into the larger diameter portion of the passage. Again, each of the two halves of the rail-to-rail coupler may have matching aligned ones of such complex cross-section passages to define a dart storage position and/or receiver of threaded rods that is able to receive and retain one of a smaller diameter dart (or one of a smaller diameter threaded rod) or one of a larger diameter dart (or one of a larger diameter threaded rod).

Embodiments of the rail-to-rail coupler described and depicted herein may also carry rail engagement formations made up of multiple "teeth" separated by "notches" that allow the rail engagement formations to engage a portion of a length of a rail that includes one or more railstops. Such railstops may be positioned within recessed portions of the rail to provide a physical stop to control the positioning of accessories that are configured to be slid onto a rail from one or the other end thereof. After considerable study of the rails of multiple Hasbro and Mattel blasters, patterns of dimensions of teeth and/or notches that are able to accommodate a wide variety of the different studied rails, and perhaps at multiple different locations along at least some of the different rails.

BRIEF DESCRIPTION OF THE DRAWINGS

A fuller understanding of what is disclosed in the present application may be had by referring to the description and claims that follow, taken in conjunction with the accompanying drawings, wherein:

FIG. 1H is a cross-sectional view of another embodiment of the rail-to-rail coupler of FIG. 1A that differs from the rail-to-rail coupler of FIG. 1A by the cross-section of the rail engagement formations thereof;

FIGS. 4C and 4D are elevational views of other embodiments of the rail-to-rail coupler of FIG. 4A that each differ from the rail-to-rail coupler of FIG. 4A in the cross-sections of one or more passages thereof.

DETAILED DESCRIPTION

Figure 1A:
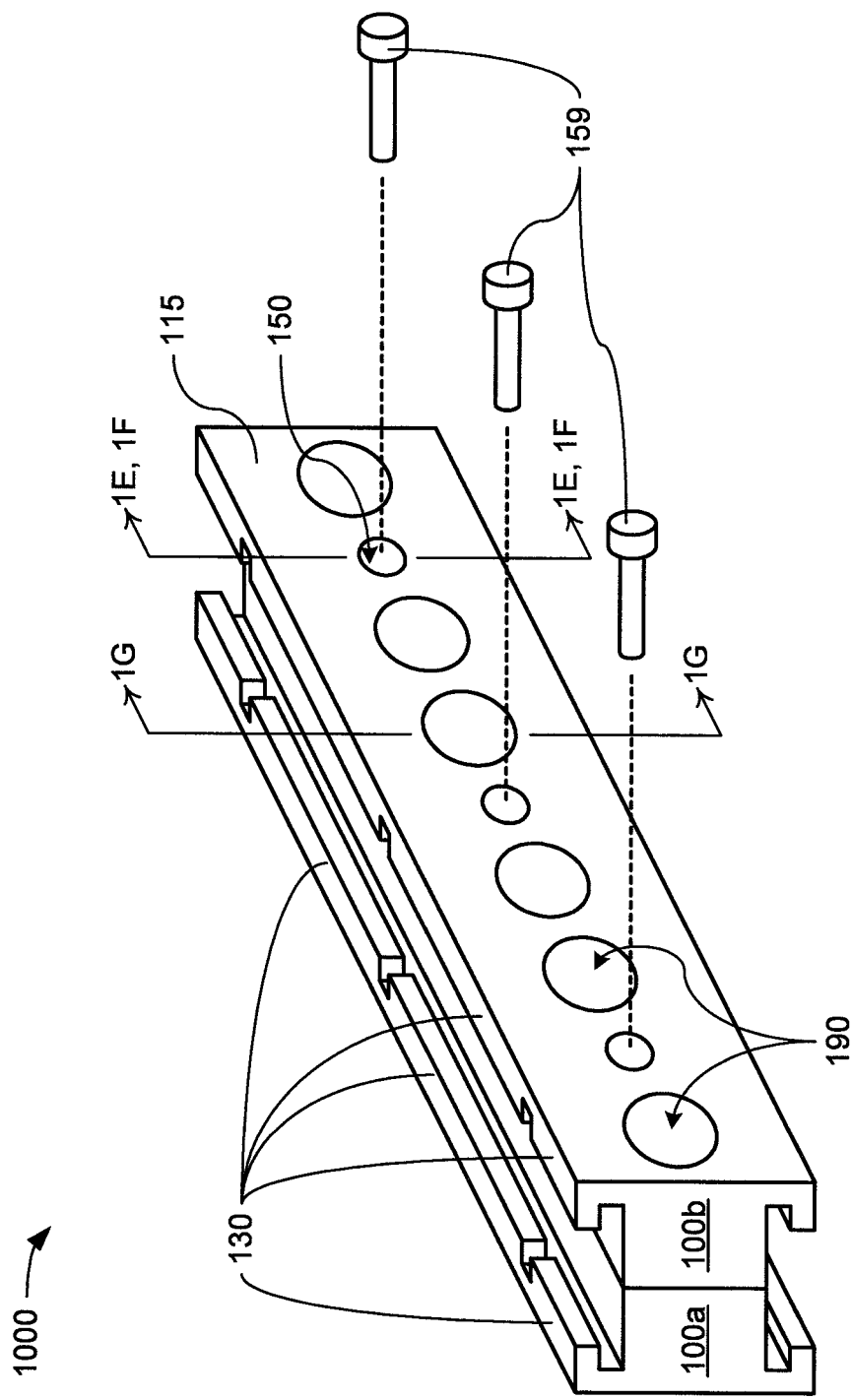
FIG. 1A is a perspective view of an embodiment of a rail-to-rail coupler carrying rail engagement formations configured to engage rails of blasters and/or onto mounting shoes of cameras and/or camera accessories.

FIGS. 1A through 1H, taken together, provide perspective, exploded perspective and cross-sectional views of differing embodiments of a rail-to-rail coupler 1000. As so depicted, the rail-to-rail coupler 1000 may be made up of two mating halves 100a and 100b that may be clamped together to cause rail engagement formations 130 thereof to engage rails 930 of toy guns 903 (often referred to as "blasters") and/or mounting shoes 940 (sometimes referred to as "cold shoes" or "hot shoes") of cameras and/or accessories for cameras 904. As also depicted, such clamping action may be effected through use of one or more screws 159 (or other elongate fasteners such as pins, rivets, etc.) extending through one or more corresponding aligned pairs of screw apertures 150 that extend into and/or through the halves 100a and/or 100b. As also depicted, pairs of aligned passages 190 may be formed through the halves 100a and 100b to allow darts 999 to extend therethrough for storage therein.

Each of the halves 100a and 100b may be formed using any of a variety of fabrication techniques from any of a variety of materials or combinations of materials. In some embodiments, each of the halves 100a and 100b may be injection molded from any of a variety of thermoplastics materials. In other embodiments, each of the halves 100a and 100b may be formed through additive manufacturing techniques, such as any of a variety of available three-dimensional (3D) printing techniques. In still other embodiments, each of the halves 100a and 100b may be mechanically milled and/or laser cut from metal, wood and/or plastics material(s). In embodiments in which thermoplastics materials are used, such thermoplastics materials may include polylactic acid (PLA), acrylonitrile butadiene styrene (ABS), polyethylene terephthalate (PET), and/or glycol-modified PET (PETG).

Figure 1B:
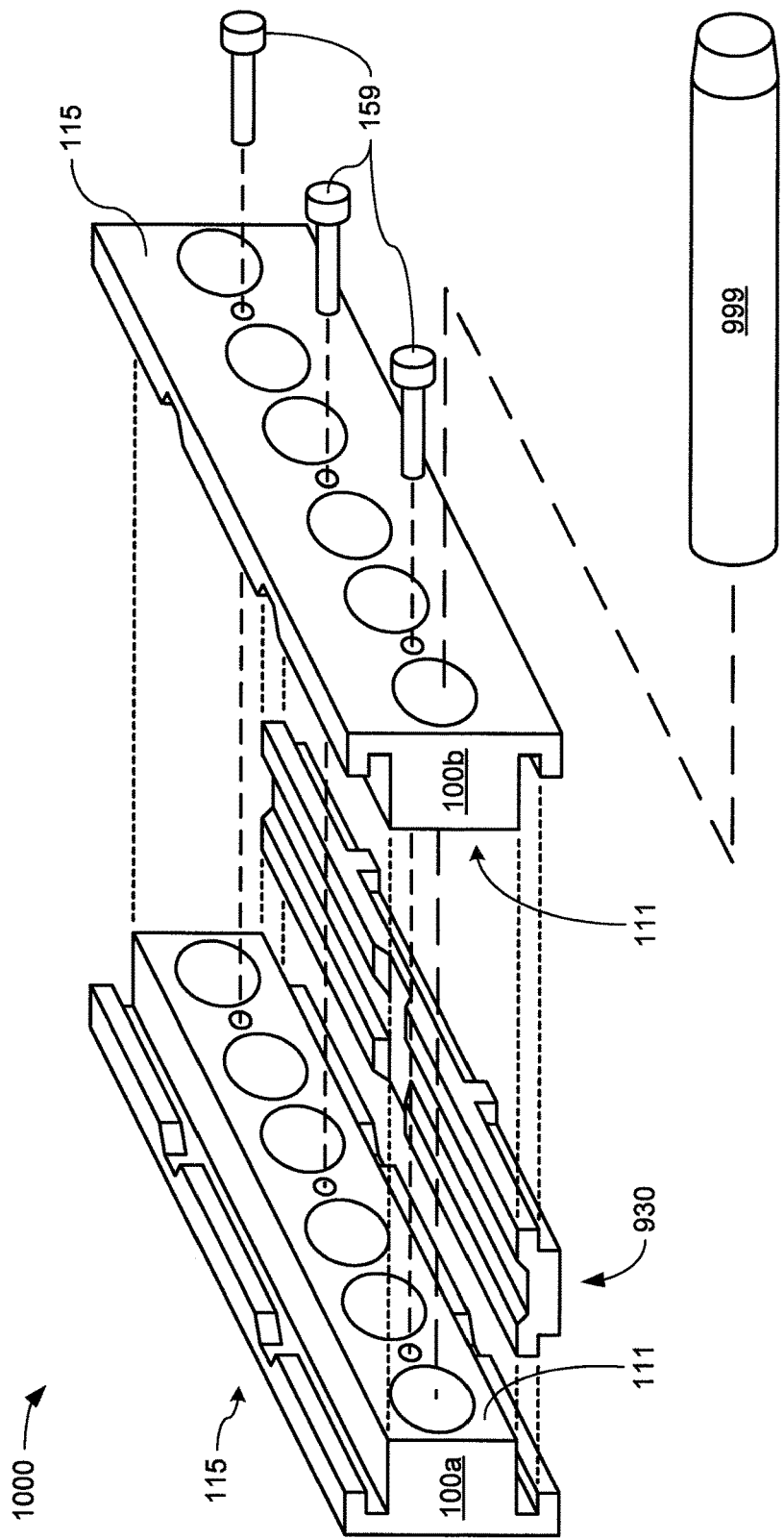
FIG. 1B is an exploded perspective view of another embodiment of the rail-to-rail coupler of FIG. 1A that differs from the rail-to-rail coupler of FIG. 1A by the quantity and configuration of teeth and gaps between teeth of the rail engagement formations thereof.
Figure 1C:
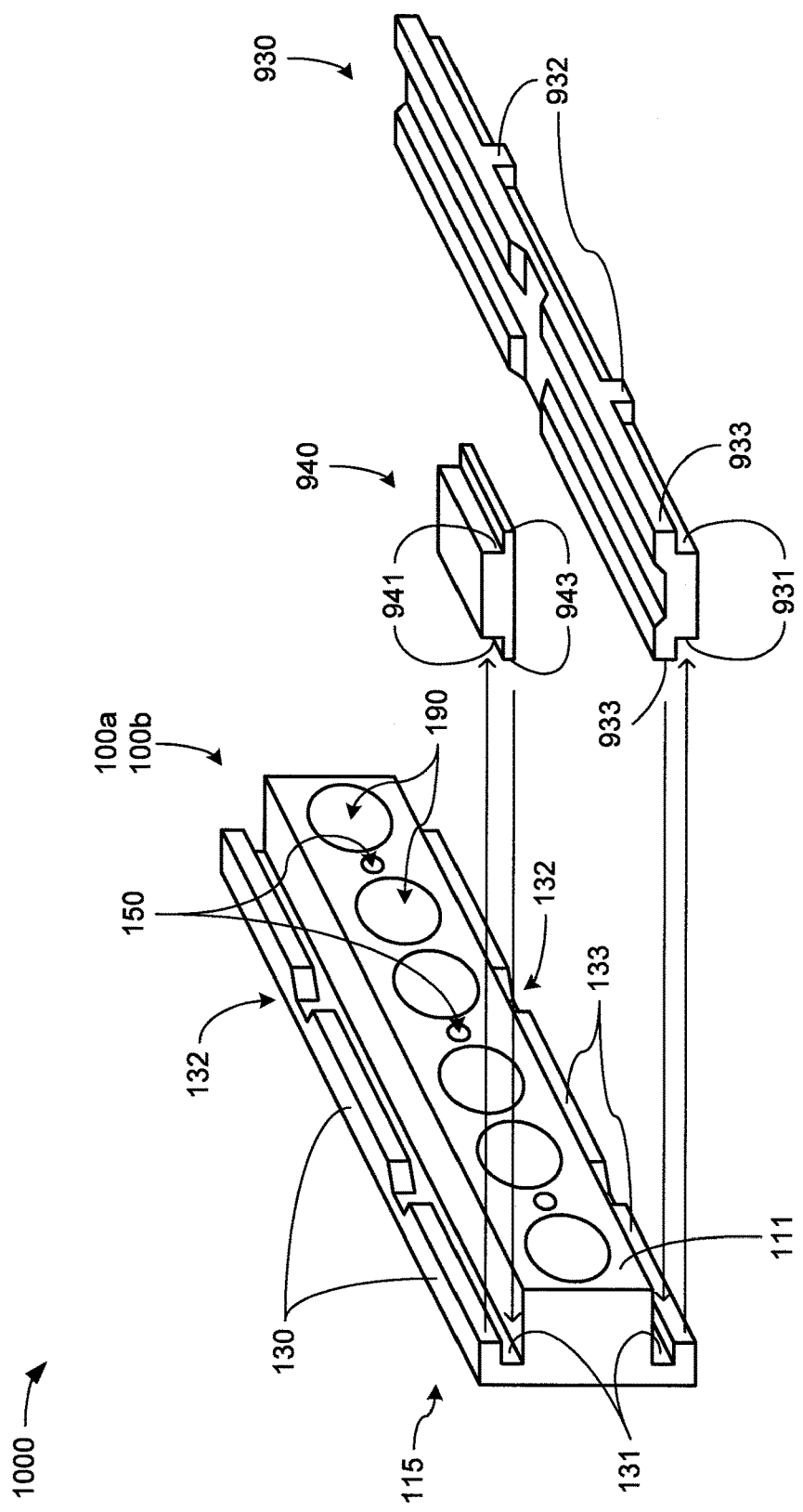
FIG. 1C is a perspective view of one of the two halves of the rail-to-rail coupler of FIG. 1B.
Figure 1D:
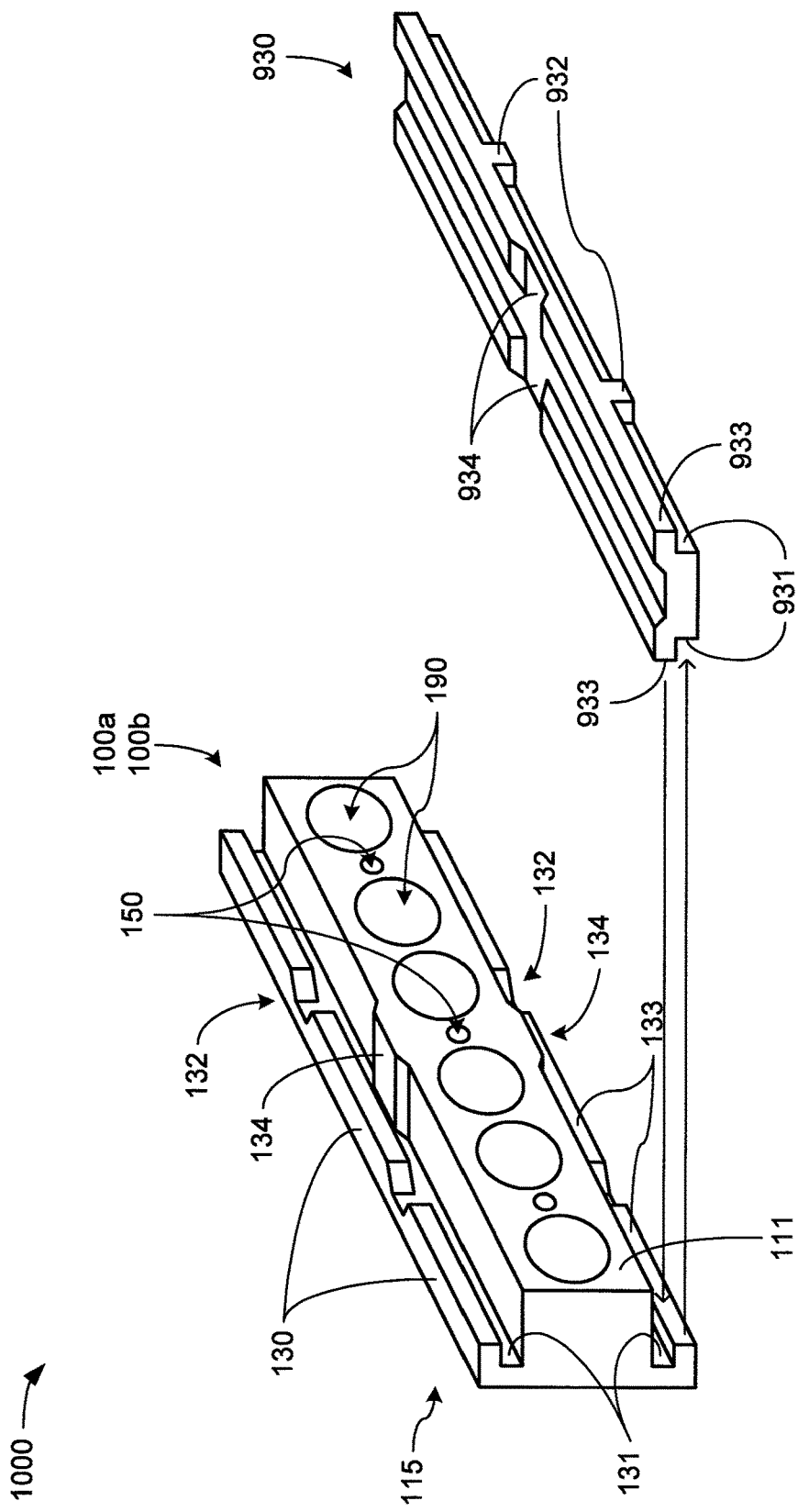
FIG. 1D is a perspective view of another embodiment of the rail-to-rail coupler of FIGS. 1B-C that additionally includes positioning formations to engage railgaps formed in rails.

Turning more specifically to FIGS. 1C-D, each of the rail engagement formations 130 may include one or more teeth 133 shaped and sized to engage corresponding elongate recess(es) 931 and/or 941 of a rail 930 and/or of a mounting shoe 940, respectively. Correspondingly, each of the rail engagement formations 130 may also define one or more elongate recesses 131 that parallel an elongate path along which the one or more teeth 133 may extend, and are shaped and sized to receive one or more outwardly projecting edges 933 and/or 943 of the rail 930 and/or of the mounting shoe 940. Additionally, separating two or more of the teeth 133 of one or more of the rail engagement formations 130 may one or more gaps 132. As depicted, in some embodiments, each such gap 132 may share a recessed surface with a corresponding elongate recess 131. Each of the gaps 132 may be shaped and sized to receive a corresponding railstop formation 932 of a rail 930. Turning more specifically to FIG. 1D, one or more of the rail engagement formation 130 of one or both of the halves 100a and/or 100b of the rail-to-rail coupler 1000 may additionally include one or more rail positioning formations 134 to engage one or more corresponding railgaps that may be formed in a rail 930.

Stated differently, and turning again to both FIGS. 1C and 1D, for each of the rail engagement formations 130, the one or more teeth 133 may be shaped and sized to extend from a recessed surface of the elongate recess 131 and any gaps 132, and toward a rail 930 or a shoe 940 to engage the elongate recess 931 or 941, respectively, thereof. Correspondingly, an edge 933 or 943 may be shaped and sized to extend from a recessed surface of an elongate recess 931 or 941 of a rail 930 or a mounting shoe 940, respectively, and toward a rail engagement formation 130 to engage the elongate recess 131 thereof. Also correspondingly, where a rail 930 is to be engaged, a railstop formation 932 may be shaped and sized to extend from a recessed surface of the elongate recess 931 of a rail 930, and toward a rail engagement formation 130 to engage a gap 132 thereof. Alternatively or additionally, and turning more specifically to FIG. 1D, where a rail 930 is to be engaged, a rail positioning formation 134 may be shaped and sized to extend from a recessed surface of an elongate recess 131 of a rail engagement formation 130, and toward a rail 930 to engage a railgap 934 thereof.

Turning more specifically to FIGS. 1A-D, each of the halves 100a and 100b may be of an elongate shape, and each may carry at least a pair of the rail engagement formations 130. Each of the rail engagement formations 130 may be of elongate configuration and positioned to extend along the lengthwise dimension of one of the halves 100a and 100b. As also depicted, pairs of the edges 933 and/or 943 of rail(s) 930 and/or mounting shoe(s) 940 may extend outwardly and in opposite directions therefrom. When the halves 100a and 100b are clamped together to cause the rail engagement formations 130 thereof to engage rail(s) 930 and/or mounting shoe(s) 940, each of the rail engagement formations 130 may extend lengthwise alongside and parallel with the lengthwise orientation of the edges 933 and/or 943 of the rail(s) 930 and/or mounting shoe(s) 940, respectively, that each of the rail engagement formations 130 are caused to engage. Thus, when the halves 100a and 100b clamped together, teeth 133 of the rail engagement formations 130 of each of the halves 100a and 100b are caused to extend towards each other.

Figure 1E:
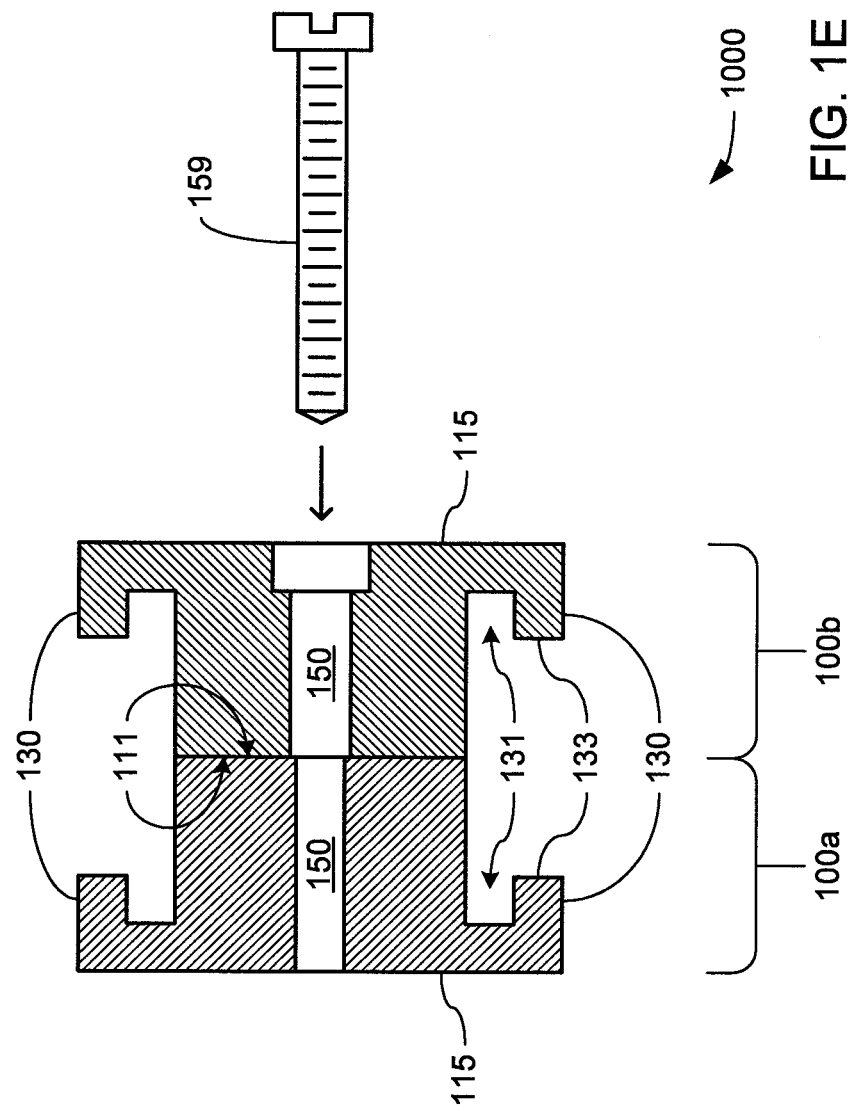
FIGS. 1E, 1F and 1G are cross-sectional views of different portions of the rail-to-rail coupler of FIG. 1A.
Figure 1F:
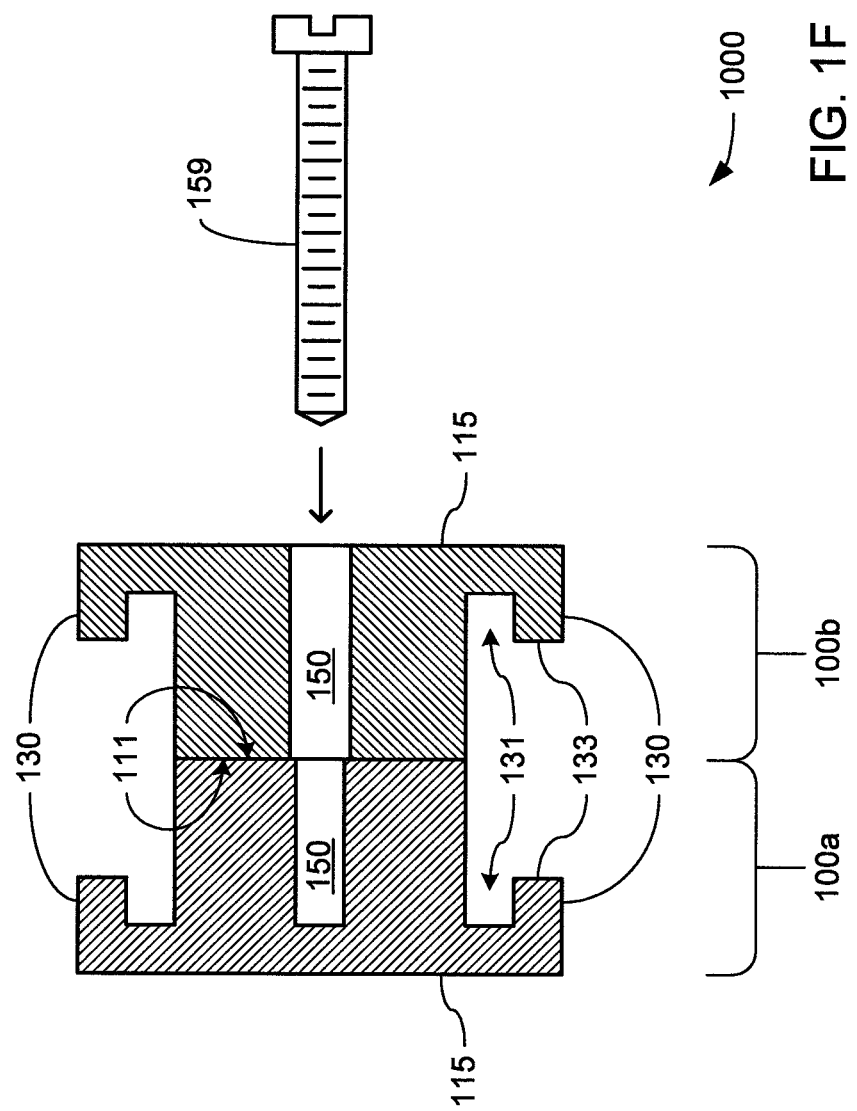
Figure 1G:
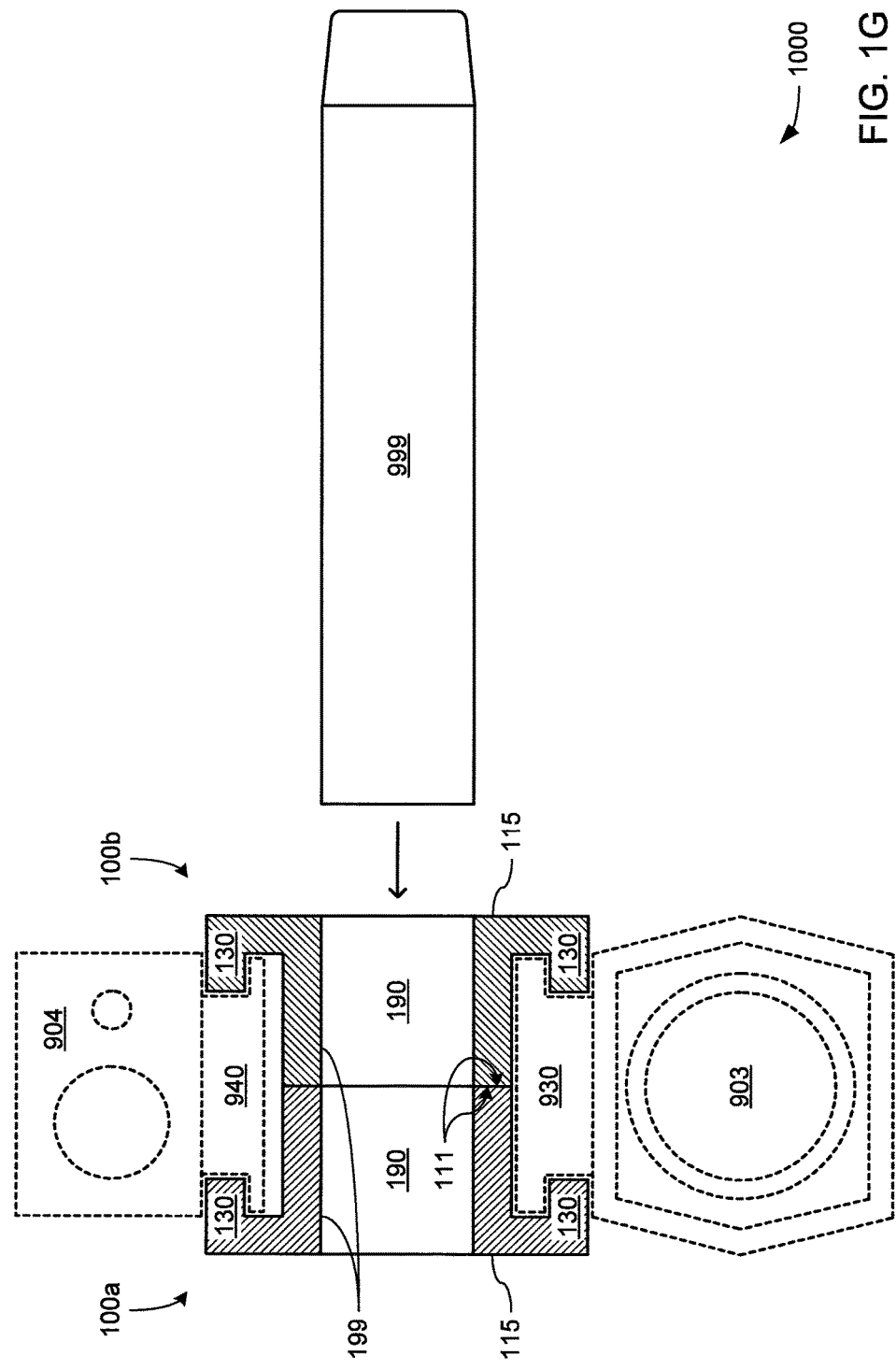

Turning more specifically to FIGS. 1B and 1G, with a single rail engagement formation 130 of each half 101a and 101b of the rail-to-rail coupler 1000 engaging a rail 930 or a mounting shoe 940 in the manner just described from opposite sides, such a rail 930 or a mounting shoe 940 may be clamped therebetween. With a rail 930 or a mounting shoe 940 so clamped, the blaster 903 associated with the rail 930 or the camera or camera accessory 904 associated with the mounting shoe 940 may be securely coupled to and retained by the rail-to-rail coupler 1000. Also, as specifically depicted in FIG. 1G, through such use of two or more corresponding pairs of rail engagement formations 130 of the halves 101a and 101b, the rail-to-rail coupler 1000 may be employed to securely couple the rails 930 of multiple blasters 903, the mounting shoes 940 of multiple cameras and/or camera accessories 904, or the rail(s) 930 and the mounting shoe(s) 940 of a combination of one or more blasters 903 and one or more cameras or camera accessories 904.

Turning more specifically to FIGS. 1A-B and 1E-F, the halves 100a and 100b may have aligned screw apertures 150 formed therein and/or therethrough. More specifically, as depicted in FIG. 1E, aligned screw apertures 150 may be formed through each of the halves 100a and 100b. Alternatively, and as depicted in FIG. 1F, one of the halves 100a may have one of the aligned screw apertures 150 formed through it, while the other of the halves 100b may have the other of the aligned screw apertures 150 formed to extend into it, but not all the way through it. As also depicted in both FIGS. 1E-F, one of the aligned screw apertures 150 may be defined to be narrower (e.g., of a smaller diameter) than the other. As a result, the threads of a corresponding screw 159 may easily slide through the wider one of the aligned screw apertures 150 (e.g., the one of the aligned screw apertures 150 with the larger diameter), but may then engage the inner surface of the narrower one of the aligned screw apertures 150. However, the larger diameter of the one of the aligned screw apertures 150 that has the larger diameter may be selected to be smaller than the diameter of the head of the screw 159 such that the head of the screw 159 may be used relied upon to press against the outward surface 115 of one of the halves 100a and 100b as part of drawing that one of the halves 100a and 100b toward the other. Thus, through rotation of the screw 159 to cause the threads thereof to engage the inner surface of the narrower one of the aligned screw apertures 150, the two halves 100a and 100b may be drawn towards each other such that facing surfaces 111 of the halves 100a and 100b are be at least pulled towards each other. As a comparison of FIGS. 1E and 1F additionally reveals, one of the aligned screw apertures 150 may have a widened portion near an outward surface 115 of one of the halves 100a and 100b to at least partially retain the head of the screw 159.

Turning more specifically to FIGS. 1A-B and 1G-H, the halves 100a and 100b may also have aligned passages 190 formed therethrough. More specifically, as depicted in FIGS. 1G-H, aligned passages 190 may be formed through each of the halves 100a and 100b. As also depicted in both FIGS. 1G-H, unlike the aligned screw apertures 150, the aligned passages 190 may be defined to have the same diameter. As a result, the aligned passages 190 formed through each of the halves 100a and 100b may both be shaped and sized to engage the outer cylindrical surface of a dart 999 with similar magnitude of friction to thereby removably retain the dart 999 within the aligned pair of passages 190 following the clamping together of the halves 100a and 100b.

Referring to all of FIGS. 1A-H, it is made clear that the passages 190, as well as the screw apertures 150, extend in a direction that is transverse at right angles to the facing surfaces 111, and thus, is transverse at right angles to the direction in which the halves 100a and 100b move towards each other when pulled towards each other as part of being clamped together.

As comparison of FIG. 1H to FIGS. 1A-G additionally reveals, the embodiment of the rail-to-rail coupler 1000 of FIG. 1H differs from those of FIGS. 1A-G in that the rail engagement formations 130 of the embodiment of FIG. 1H are shaped and sized to engage a Picatinny variant of rail 930, with its pointed edges 933.

Figure 2:
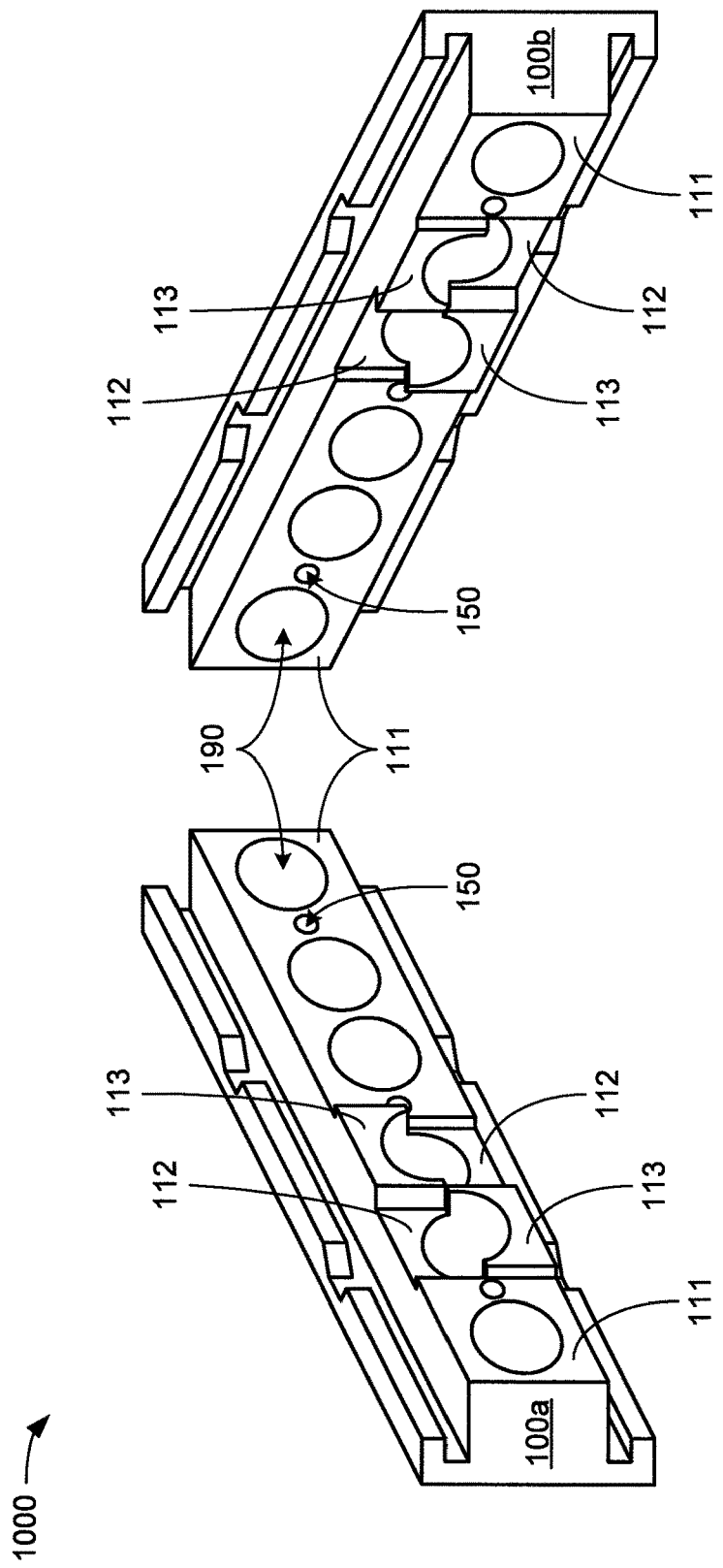
FIG. 2 is an exploded perspective view of another embodiment of the rail-to-rail coupler of FIGS. 1B-C that additionally includes alignment formations carried by facing surfaces of the two halves thereof.

FIG. 2, provides a perspective view of another embodiment of the rail-to-rail coupler 1000 of FIG. 1A, but with the two halves 100a and 100b pulled away from each other and slightly rotated relative to each other to enable the facing surfaces 111 of both to be seen. As depicted, at least a portion of the facing surface 111 of each of the two halves 100a and 100b may carry one or more alignment projections 113 and/or one or more alignment recesses 112 to interfit in a manner that serves to ensure proper alignment of the two halves 100a and 100b relative to each other as they are drawn together as part of being clamped together. As recognizable to those skilled in the art, depending on the dimensions of one or more rails 930 and/or one or more mounting shoes 940 that may be clamped between opposing rail engagement formations 130 of the two halves 100a and 100b, the facing surfaces 111 of the two halves 100a and 100b may be pulled toward each other during clamping, but may only partially come into contact with each or may not come into contact with each other, at all. Also, although one or more of the screws 159 may cooperate with corresponding pairs of the aligned screw apertures to exert some degree of control over the alignment of the two halves 100a and 100b as they are pulled towards each other, the degree of control so exerted may not be enough to fully properly align them, especially if the two halves 100a and 100b are unable to be brought close enough together to cause the facing surfaces 111 to come into contact.

The alignment projections 113 and corresponding alignment recesses 112 may be shaped and sized so as to cause an interfitting interaction among the alignment projections 113 and between the alignment projections 113 and the alignment recesses 112 to occur as the two halves 100a and 100b are pulled towards each other and before the facing surfaces 111 would meet. As a result rotational and/or translational movement of one of the halves 100a or 100b relative to the other in a direction transverse to the direction of the clamping motion of the halves 100a and 100b towards each other may be prevented. As a result, the facing surfaces 111 do not need to meet to ensure proper alignment of the halves 100a and 100b when clamping one or more rails 930 and/or one or more mounting shoes 940.

FIGS. 3A through 3F, taken together, provide perspective, exploded perspective and cross-sectional views of further embodiments of the rail-to-rail coupler 1000 in which one or more of the aligned screw apertures 150 and/or one or more of the aligned passages 190 are lined with phosphorescent material 120. As familiar to those skilled in the art, so-called "Nerf Wars" and/or situations under which cameras may be need to be set up to capture images may involve activity in conditions of little or no ambient lighting such that the act of inserting objects into apertures and/or passages may be made more difficult as such apertures and/or passages may become difficult to see. With one or more of the screw apertures 150 and/or one or more of the passages 190 lined with phosphorescent material 120, the act of briefly shining a flashlight into one or more of such screw apertures 150 and/or passages 190 may cause such material to emit some amount of light for a brief period, thereby making such screw apertures 150 and/or passages 190 more visible in such compromised lighting conditions for a brief period of time.

Turning to FIGS. 3A and 3C-F, an outwardly facing portion 125 of the phosphorescent material 120 may be allowed to be visible through portions of the outward surfaces 115 of the halves 100a and 100b through which one or more of the screw apertures 150 and/or one or more of the passage 190 extend. More specifically, while the majority of the outward surfaces 115 may be made from a non-phosphorescent material 110, a ring of the phosphorescent material 120 that lines one or more of the screw apertures 150 and/or one or more of the passages 190 may be allowed to be visible at the outward surfaces 115 such that the facing portion(s) 125 thereof forms part of the outward surfaces 115. This may be done to enhance the improved visual guidance of the locations of such screw aperture(s) 150 and/or passage(s) 190 in conditions of little or no lighting.

Figure 3A:
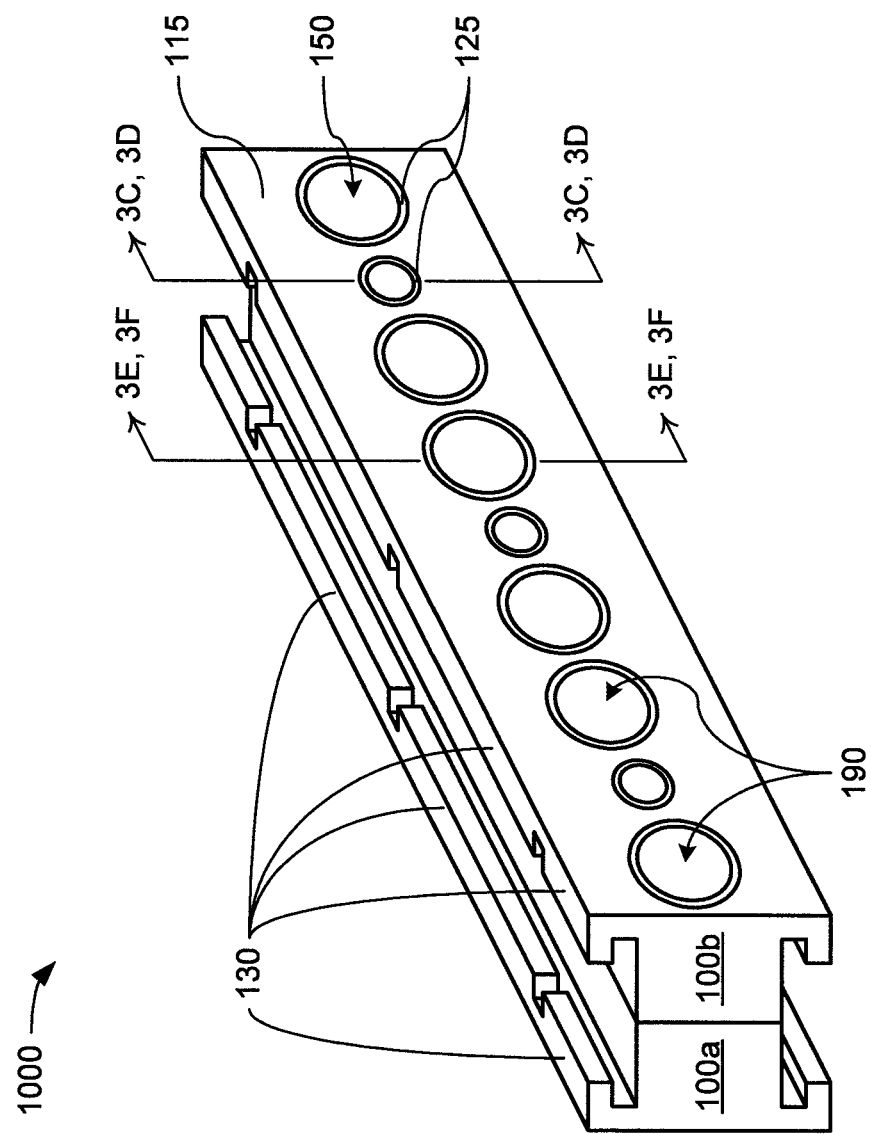
FIG. 3A is a perspective view of another embodiment of the rail-to-rail coupler FIG. 1A that additionally includes phosphorescent material that defines at least portions of one or more of the screw apertures and/or other passages thereof.
Figure 3B:
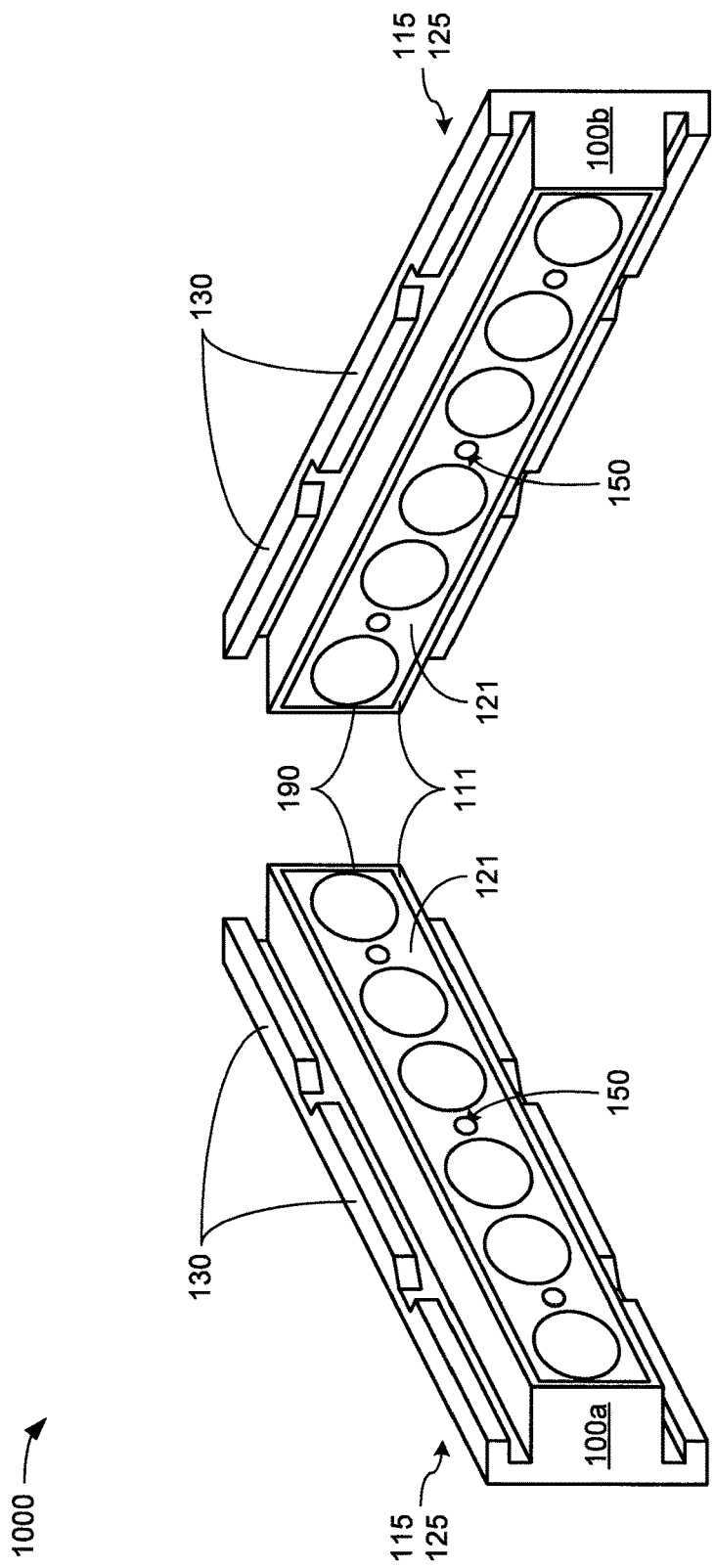
FIG. 3B is an exploded perspective view of another embodiment of the rail-to-rail coupler of FIGS. 1B-C that additionally includes phosphorescent material that defines at least portions of one or more of the screw apertures and/or other passages thereof.
Figure 3C:
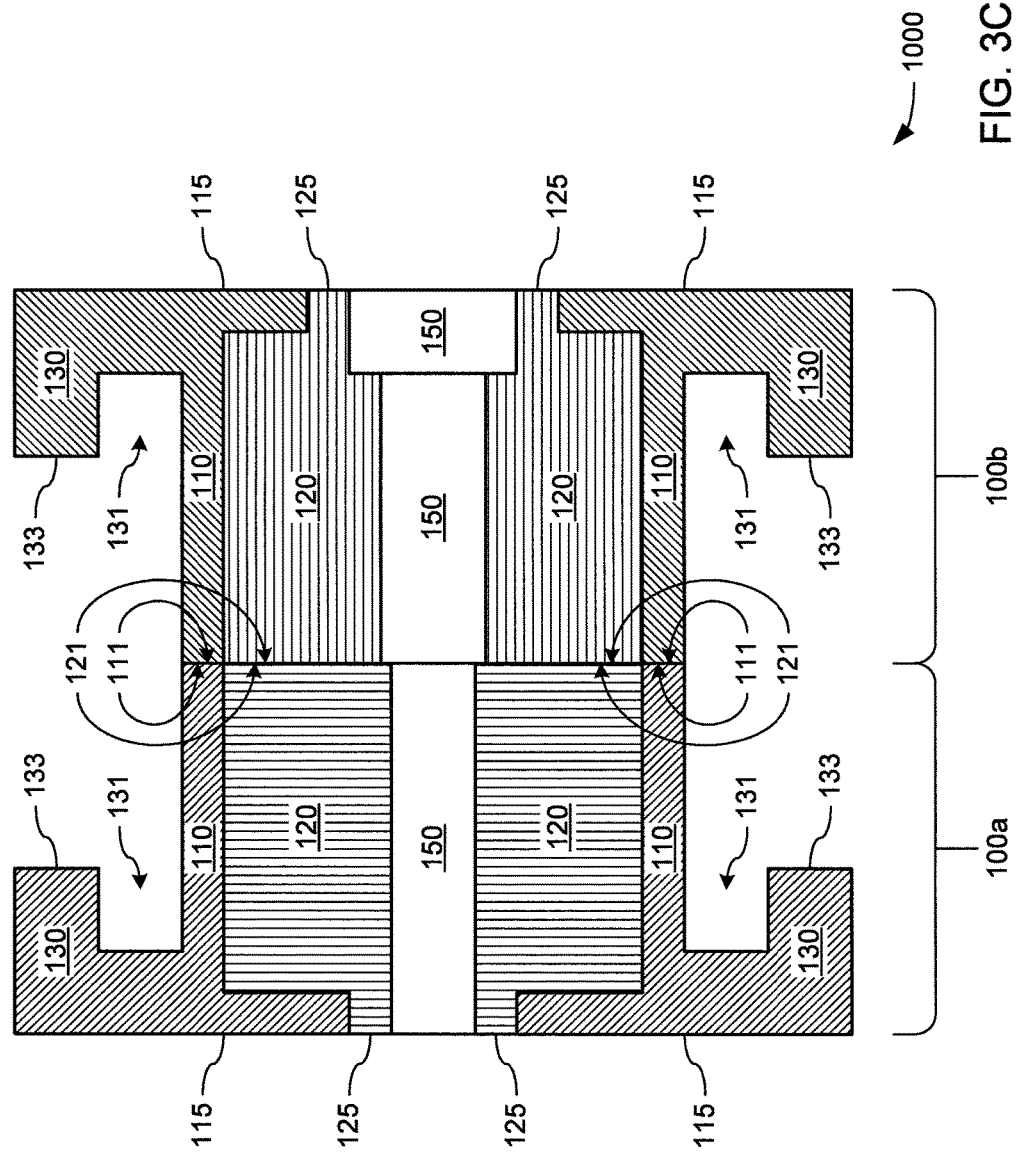
FIGS. 3C, 3D, 3E and 3F are cross-sectional views of the rail-to-rail coupler of FIG. 3A.
Figure 3D:
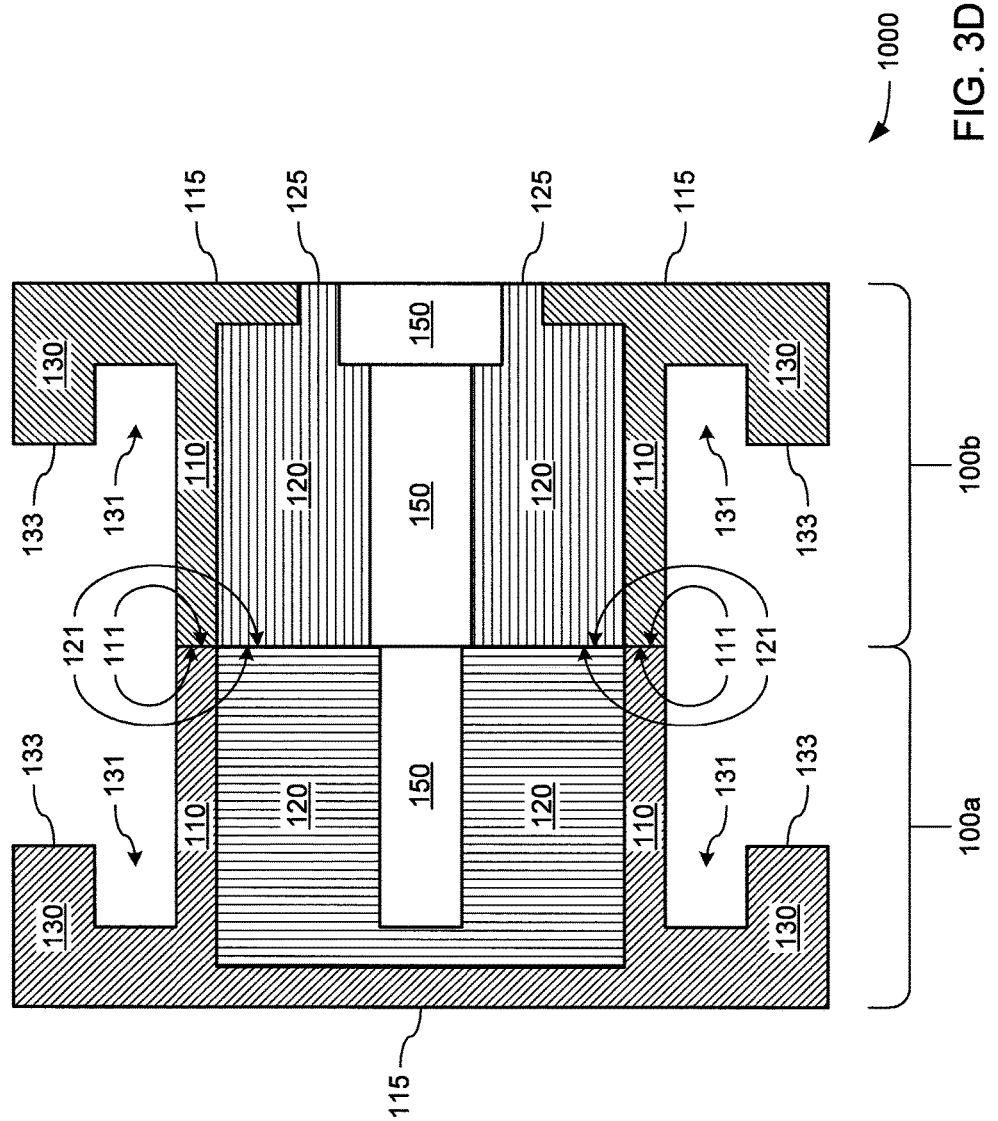
Figure 3E:
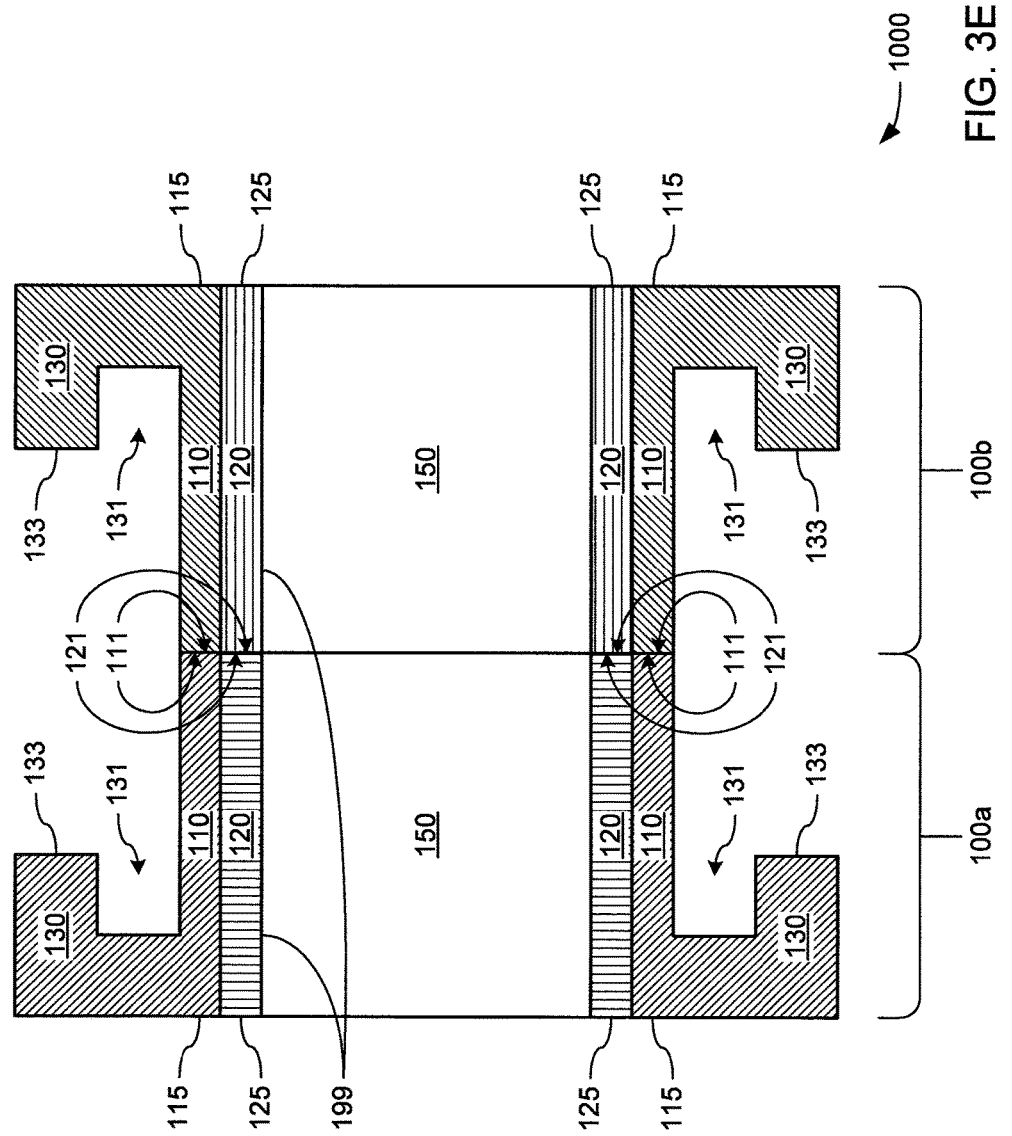
Figure 3F:
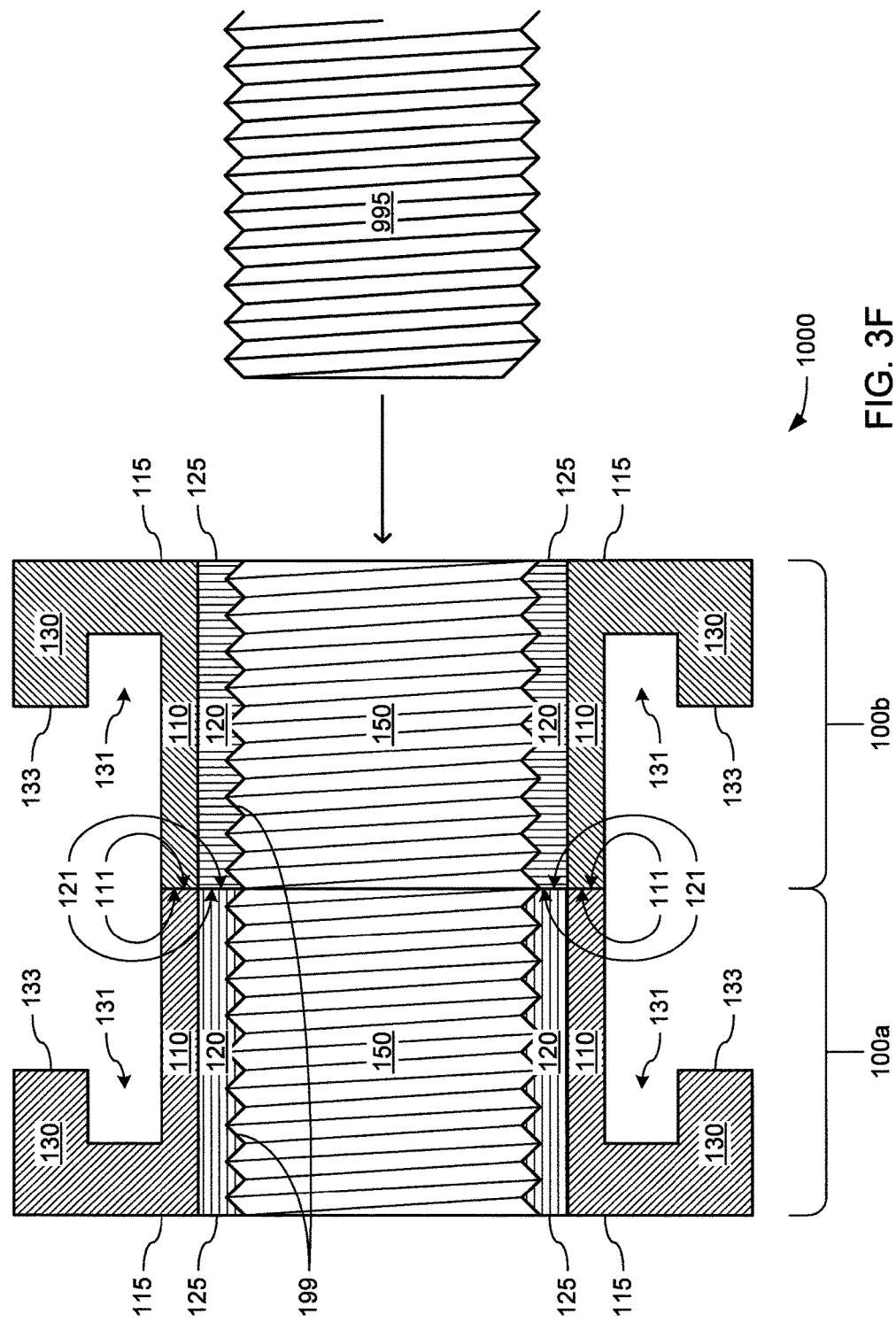

Turning to FIGS. 3C-F, in some embodiments, the phosphorescent material 120 may, in addition to lining one or more of the screw apertures 150 and/or one or more of the passages 190, form much of the core material from which each of the halves 100a and 100b may be formed, with the non-phosphorescent material 110 serving to form a "shell" that surrounds much of such a core of the phosphorescent material 120. The cross-sectional views provided by FIGS. 3C-E substantially mirror the cross-sectional views provided by FIGS. 1E-G, respectively, to thereby provide depictions of embodiments of the structure shown in each of FIGS. 1E-G in which the phosphorescent material 120 makes up much of the material from which each of the halves 100a and 100b are formed. FIG. 3F provides a cross-sectional view of a pair of aligned passages 190 that is similar to that provided in FIG. 3E, but the embodiment of FIG. 3F differs in that the cylindrical inner surface 199 of the depicted pair of aligned passages 190 is formed to define female threads to engage male threads 995 formed on a shaft, bolt, threaded rod, etc. that may thereby be threaded into one or both of the depicted aligned passages 190.

The use of the phosphorescent material 120 to form much of the core material of each of the halves 100a and 100b may provide a greater volume therein of the phosphorescent material 120 to be energized by radiant energy (e.g., light) provided through one or more of the screw apertures 150 and/or passages 190 to thereby subsequently cause the phosphorescent material 120 to emit light for a brief period of time. The phosphorescent material 120 may be any of a variety of materials that include phosphorescent pigment, dye, and/or other form of phosphorescent component material. In some embodiments, the phosphorescent material 120 and the non-phosphorescent material 110 may be formed together, as by 3D printing in which both a filament of the phosphorescent material 120 and a filament of the non-phosphorescent material 110 are both fed to a 3D printer to form each of the halves 100a and 100b. In other embodiments, the core portion of each of the halves that is made up of the phosphorescent material 120 may be formed entirely separately from the shell portion of each of the halves that is made up of the non-phosphorescent material 110, and then the core and shell portions may be subsequently assembled together to form each of the halves 100a and 100b.

Turning to FIG. 3B, as depicted, in some embodiments, the core portion of each of the halves 100a and 100b that is made up of the phosphorescent material 120 may be made more fully accessible at the facing surfaces 111, with the shell portion that is made up of the non-phosphorescent material 110 forming only the outermost surrounding portion of each of the facing surfaces 111. This may be deemed desirable to allow the two core portions to be greatly exposed to each other when the two halves 100a and 100b are clamped together such that light shined into one or more of the screw apertures 150 and/or one or more of the passages 190 of one of the halves 100a and 100b is able to more easily penetrate through the phosphorescent material 120 of the one of the halves 100a and 100b, and penetrate into the phosphorescent material 120 of the other of the halves 100a and 100b, thereby allowing the phosphorescent material 120 of both halves 100a and 100b to receive exposure to such radiant energy and to thereby be caused to subsequently emit light for a brief period of time.

FIGS. 4A through 4E, taken together, provide exploded perspective and elevational views of further embodiments of the rail-to-rail coupler 1000 in which one or more of the aligned screw apertures 150 and/or one or more of the aligned passages 190 are or a more complex cross-sectional shape than the simpler circular cross-sections depicted in the preceding FIGURES. As previously discussed, there are multiple differing shapes and/or sizes of darts. Also, where one or more of the aligned passages 190 are threaded (as depicted in FIG. 3F) and/or are otherwise sized or configured to receive rods, shafts, etc., such objects to be so inserted may be of differing dimensions. Thus, it may be deemed desirable to increase the utility of one or more of the passages 190 and/or to make greater use of the available surface area of each of the outward surfaces 115 by forming one or more of the passages 190 to accept darts and/or rods/shafts/bolts of differing dimensions.

Figure 4A:
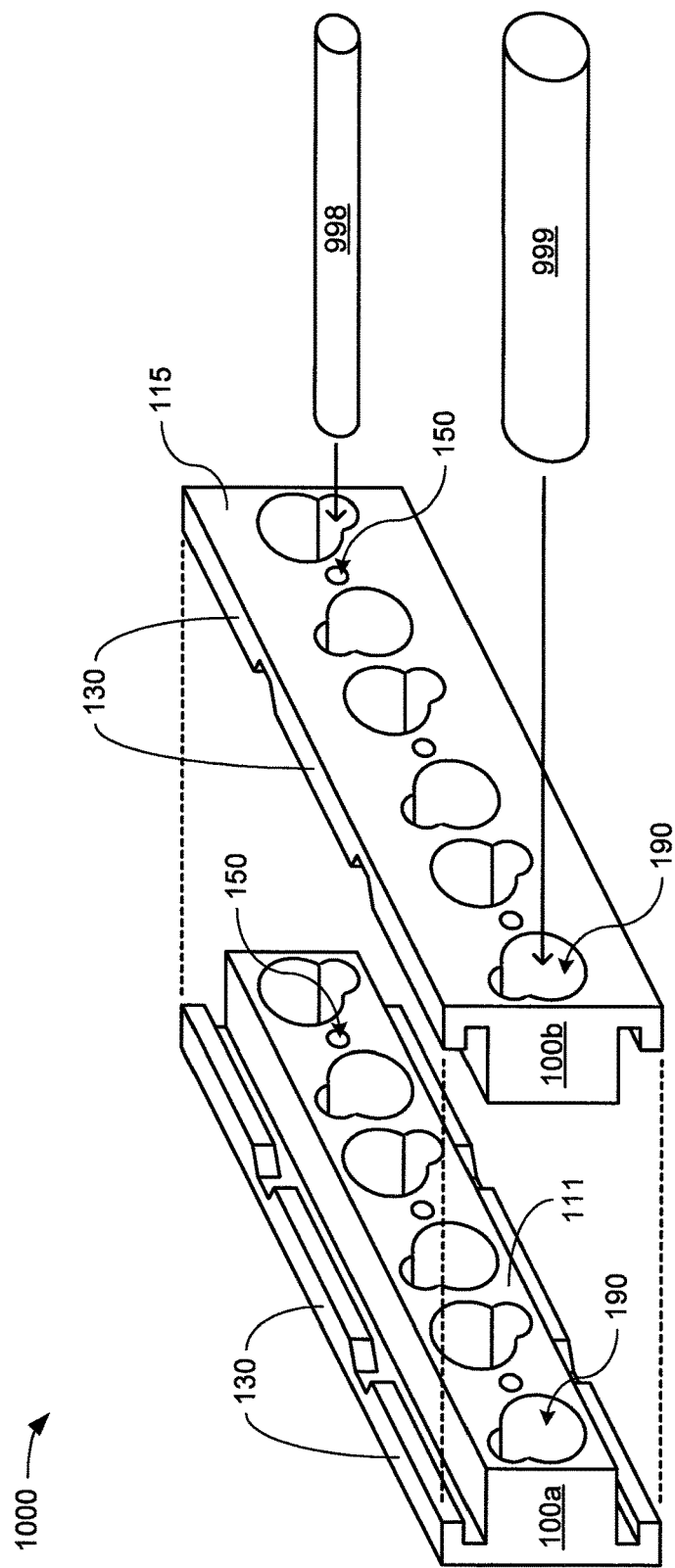
FIG. 4A is a perspective view of another embodiment of the rail-to-rail coupler FIGS. 1B-C that differs from the rail-to-rail coupler of FIGS. 1B-C by the cross-section of one or more of the passages thereof.
Figure 4B:
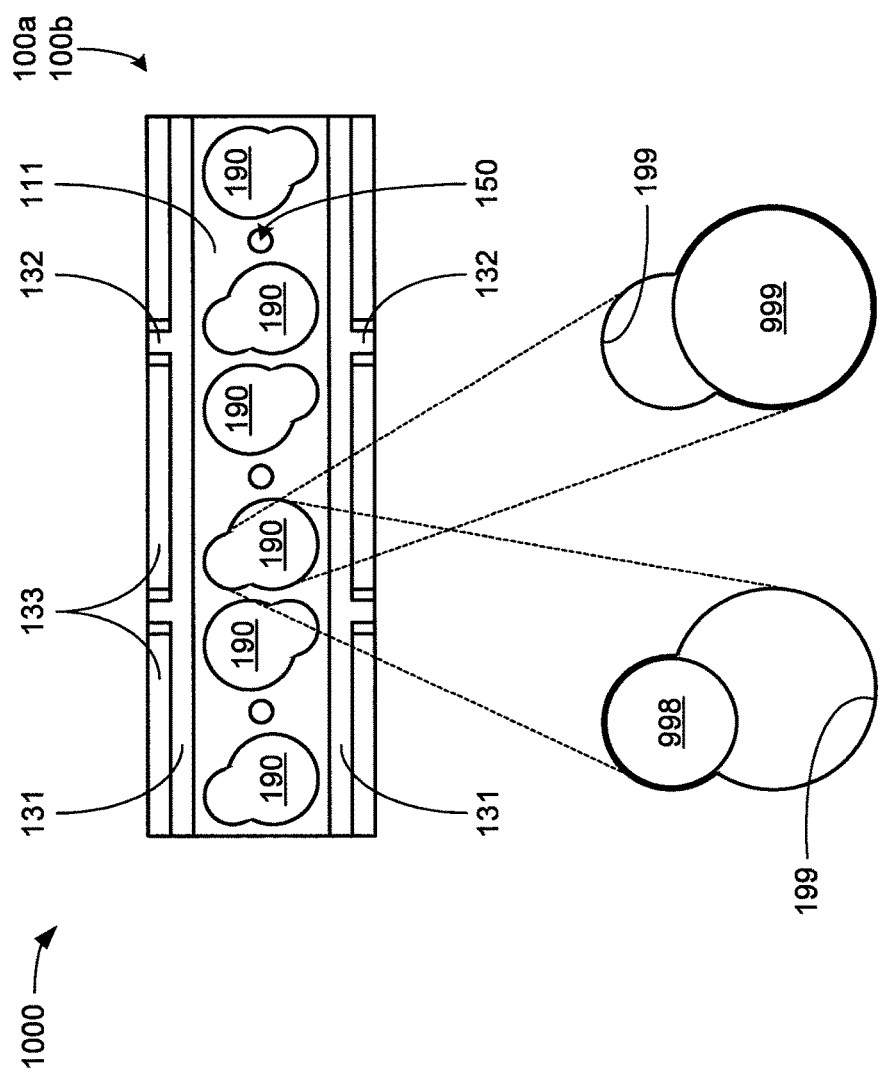
FIG. 4B is an elevational view of the one of the halves of the rail-to-rail coupler of FIG. 4A depicting and showing details of one of the cross-section of one of the passages thereof.

By way of example, and turning more specifically to FIGS. 4A-B, one or more of the pairs of aligned passages 190 may be formed to have a cross-sectional shape made up of an intersecting pair of circular shapes that are of different diameters in which each of the two diameters are meant to correspond to the differing diameters of two different cylindrical objects, such as the depicted larger and smaller diameter darts 999 and 998, respectively. The degree to which the two circular shapes intersect each other may be selected to ensure that there is enough of the smaller diameter circular shape that remains outside of the larger circular shape to surround more than 180 degrees worth of the exterior cylindrical surface of the corresponding smaller diameter object (e.g., the smaller diameter dart 998) to enable the corresponding smaller diameter object to be retained within the portion of such a passage 190 that is defined by the smaller diameter circular shape, and not be released into the other portion of such a passage 190 that is defined by the larger diameter circular shape.

Figure 4C:
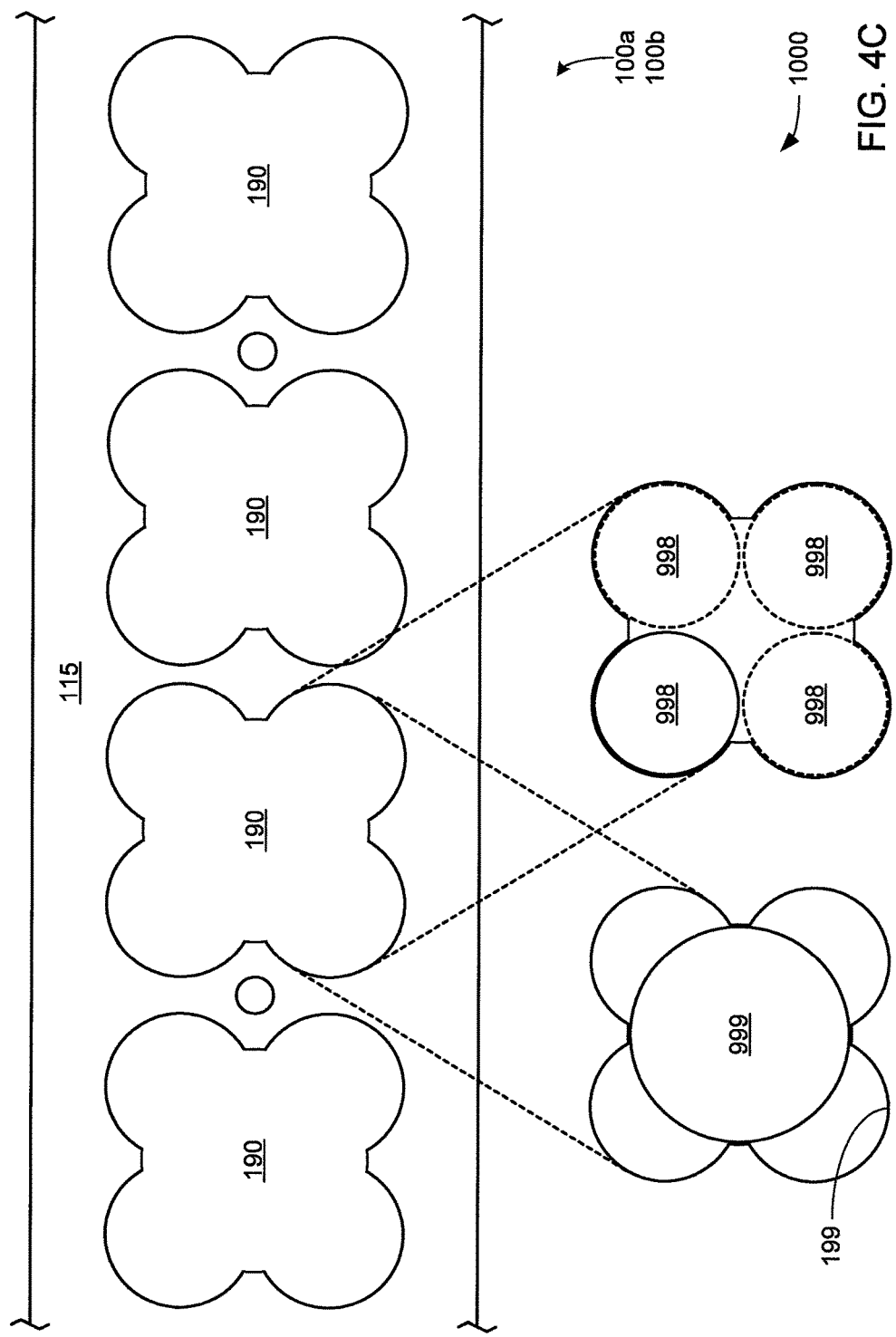
Figure 4E:
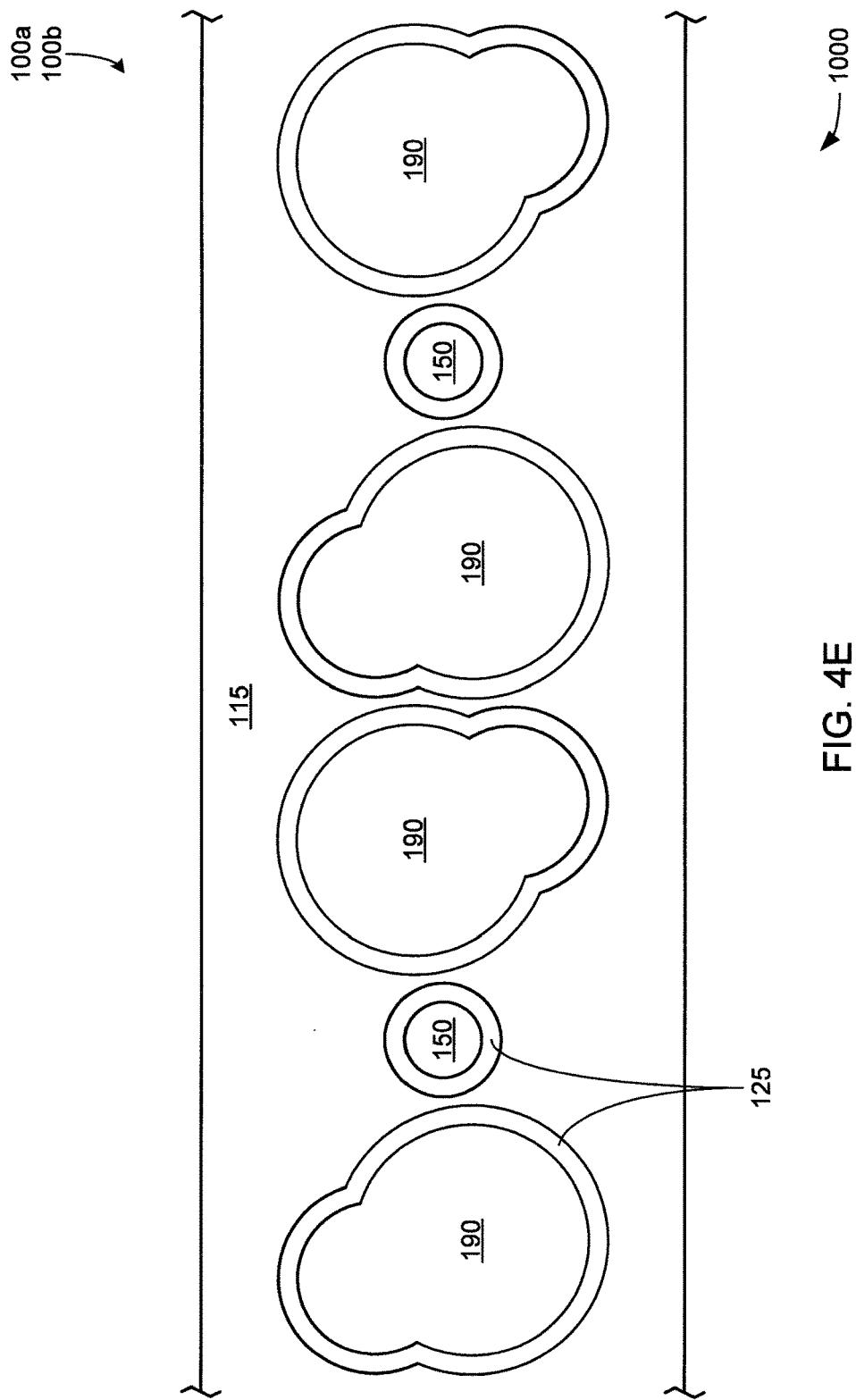
FIG. 4E is an elevational view of another embodiment of the rail-to-rail coupler of FIG. 4A that additionally includes phosphorescent material lining at least portions of the screw apertures and/or other passages thereof.

FIGS. 4C-D provide elevational views of outward surfaces 115 of other embodiments of one or both of the halves 100a and 100b in which other examples of more complex cross-sectional shapes are formed therethrough. While the complex cross-sectional shape depicted FIGS. 4A-B allow either one smaller diameter object or one larger diameter object (e.g., one of the smaller diameter darts 998 or one of the larger diameter darts 999) to be inserted and retained therein, the complex cross-sectional shapes depicted in FIGS. 4C-D allow differing quantities of smaller diameter versus larger diameter objects to be inserted and retained therein. More specifically, the complex cross-sectional shape of FIG. 4C allows either one larger diameter object to be inserted and retained therein, or a quantity of one to four smaller diameter objects to be inserted and retained therein. In contrast, the complex cross-sectional shape of FIG. 4D allows either one larger diameter object to be inserted and retained therein, or a quantity of one or two smaller diameter objects to be inserted and retained therein. Still other complex cross-sectional shapes for one or more of the passages 190 are depicted in the above-referenced U.S. Provisional Application Ser. No. 62/389,188 filed Feb. 19, 2016, which is again incorporated herein by reference in its entirety.

As a comparison of the various figures herein reveals, the rail engagement formations 130 of different embodiments of each of the halves 100a and 100b include differing quantities and locations of the gaps 132. It should be noted that, although the figures herein have depicted a relatively uniform spacing of the gaps 132 along the lengths of the depicted ones of the rail engagement formations 130, embodiments are possible in which one or more of the rail engagement formations 130 may include differing quantities of the gaps 132 spaced at non-uniform intervals to accommodate the different locations of railstops 932 along the different rails 930 of various different blasters 903. As depicted in the figures of the above-referenced U.S. Provisional Application Ser. No. 62/389,188, the rails 930 carried on different portions of different ones of the blasters 903 manufactured by Hasbro, Incorporated under the brand name Nerf may be of differing lengths and may have differing quantities of the railstops 932 at differing positions along the lengths thereof. Thus, in some embodiments of the rail-to-rail coupler 1000, multiple gaps 132 may be formed in the rail engagement formations 130 such that the teeth 133 thereof may be divided at different locations and, as a result, have differing lengths, to accommodate different combinations of blasters that may be deemed desirable to support.

By way of example, it may be deemed desirable to position one or more gaps 132 along the rail engagement formations 130 of an embodiment of the rail-to-rail coupler 1000 to support various specific combinations of specific blasters 903, such as combinations of flywheel-based blasters with spring-based blasters. As familiar to those skilled in the art, flywheel-based blasters offer the ability to rapidly launch multiple darts quite quickly with relatively rapid use of one or two trigger buttons by one or two fingers of a single hand. Unfortunately, the electric motors of flywheel-based blasters tend to be relatively noisy, and there is often a need to first turn on the electric motors and wait a period of time for the flywheels that launch darts to spin up to an effective launching speed before further operating the flywheel-based blaster to actually begin launching darts. The spinning up of the motors can have the undesirable result of giving away the position of the operator of the flywheel-based blaster to others at a time before the operator while the operator is forced to wait before being able to launch any darts. In contrast, spring-based blasters can be operated in a manner in which they remain silent up until the moment a trigger is operated to launch a dart, thereby enabling stealthier use of spring-based blasters. The disadvantage to spring-based blasters is often the need to perform a time-consuming, separate and distinct priming action to prime the spring thereof before the spring-based blaster is able to then launch another dart. It is this separate and distinct priming action, typically performed with the other hand than the one used to operate the trigger, that results in spring-based blasters being slower then flywheel-based blasters in their rate of fire.

Being able to use an embodiment of the rail-to-rail coupler 1000 to couple together a flywheel-based blaster 903 and a spring-based blaster 903 enables a single person to more easily gain the benefit of both. By coupling particular blasters 903 together in particular combinations using the rail-to-rail coupler 1000, a spring-based blaster 903 may be coupled to a flywheel based blaster 903 at a location relative to the flywheel-based blaster 903 that enables operation of the spring-based blaster 903 with one hand and the operation of the flywheel-based blaster 903 with the other. Due to the physical shapes, sizes, and other physical configuration details of different flywheel-based blasters 903 and spring-based blasters 903, some combinations thereof may prove more easily functional than others. Also, the degree of functionality may be dependent on coupling such pairs of blasters 903 together such that they are given one or more particular relative locations that provide ergonomic relative locations of handles and/or that ensure that various moving parts of one or both blasters 903 are free to move without colliding with parts of the other.

To increase the ease with which an embodiment of the rail-to-rail coupler 1000 may be used to create such a combination of blasters 903 coupled together in a manner that provides such ergonomic and/or functional benefits, one or more gaps 132 may positioned along the lengths of one or more of the rail engagement formations 130 at locations selected to guide the positioning of the rail engagement formations 130 relative to particular rails 930 carried by each of two blasters 903 of a particular pair of blasters 903. By so guiding the relative locations of such an embodiment of the rail-to-rail coupler 1000 and each of the two blasters 903, the rail-to-rail coupler 1000 serves to guide the positioning of the two blasters 903 relative to each other. In some of such embodiments, various indicia may be printed, molded, engraved and/or otherwise disposed adjacent one or more of the gaps 132 formed along the length of one or more of the rail engagement formations 130 that may specify the locations at which a railstop 932 of a particular rail 930 of a particular blaster 903 is to be positioned as part of using an embodiment of the rail-to-rail coupler 1000 to couple that particular blaster 903 to another particular blaster 903 to form a particular combination of the two particular blasters. The figures of above-referenced U.S. Provisional Application Ser. No. 62/389,188 include depictions of multiple ones of such combinations of blasters 903 using an embodiment of the rail-to-rail coupler fabricated using a 3D printer.

It should be noted that, despite the depiction herein of various embodiments of the rail-to-rail coupler with particular quantities, shapes and/or sizes of the aligned screw apertures 150, the aligned passages 190 and/or the gap 132, other embodiments of the rail-to-rail coupler 1000 depicted and described herein are possible that include different quantities, shapes and/or sizes of these features. It should also be noted that, despite the depiction herein of the aligned screw apertures 150 and the aligned passages 190 being positioned in a linear arrangement that follows the length of the elongate shape of the embodiments depicted and described herein, other embodiments are possible in which these features are not arranged in such a linear arrangement.

Although the invention has been described in a preferred form with a certain degree of particularity, it is understood that the present disclosure of the preferred form has been made only by way of example, and that numerous changes in the details of construction and the manner of manufacture may be resorted to without departing from the spirit and scope of the invention. It is intended to protect whatever features of patentable novelty exist in the invention disclosed.

The invention claimed is:

1. An apparatus comprising two halves of a rail-to-rail coupler, wherein:
    each half carries at least one rail engagement formation comprising at least two teeth separated by at least one notch to enable engagement with a portion of a rail associated with a toy gun that incorporates at least one rail stop; and
    at least one passage is formed through each half that aligns with the at least one passage formed through the other of the two halves to provide a dart storage position into which a dart may be inserted when the two halves are assembled together to engage a rail associated with a toy gun.

2. The apparatus of claim 1, wherein the at least one passage formed through each of the two halves has a complex cross-section defined by two intersecting round cross-sections that each open into the other to enable the complex cross-section to receive and retain either a first dart of a smaller diameter or a second dart of a larger diameter.

\* \* \* \* \*